US011641261B1

(12) United States Patent
Khoshnevisan et al.

(10) Patent No.: US 11,641,261 B1
(45) Date of Patent: May 2, 2023

(54) DOWNLINK CONTROL INFORMATION SIZE ADJUSTMENT BASED ON UNIFIED TRANSMISSION CONFIGURATION INDICATOR STATE

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/575,880

(22) Filed: Jan. 14, 2022

(51) Int. Cl.
*H04L 5/00* (2006.01)

(52) U.S. Cl.
CPC .......... *H04L 5/0053* (2013.01); *H04L 5/0051* (2013.01)

(58) Field of Classification Search
CPC ............................ H04L 5/0053; H04L 5/0051
See application file for complete search history.

(56) References Cited

U.S. PATENT DOCUMENTS

2021/0385832 A1* 12/2021 Zhang ................... H04W 80/02

* cited by examiner

*Primary Examiner* — Ronald B Abelson
(74) *Attorney, Agent, or Firm* — Holland & Hart LLP

(57) ABSTRACT

Methods, systems, and devices for wireless communications are described. A user equipment (UE) may receive a first control message that maps at least one transmission configuration indicator (TCI) codepoint to two TCI states. The UE may receive a downlink control information (DCI) message that schedules an uplink shared channel transmission. The DCI message may include a first set of fields specifying configuration information for a first set of repetitions of the uplink shared channel transmission. Based on the first control message including the mapping, the DCI message may also include an additional second set of fields specifying configuration information for a second set of repetitions of the uplink shared channel transmission. The UE may transmit the uplink shared channel transmission in accordance with the DCI message.

30 Claims, 20 Drawing Sheets

DOWNLINK CONTROL INFORMATION SIZE ADJUSTMENT BASED ON UNIFIED TRANSMISSION CONFIGURATION INDICATOR STATE

FIELD OF TECHNOLOGY

The following relates to wireless communications, including downlink control information size adjustment based on unified transmission configuration indicator state.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, UEs and base station may use one or more beam configurations for communications. Such beam configurations may be indicated by a transmission configuration indicator (TCI) state, where a UE and base station may use one or more TCI states for uplink communications, downlink communications, or both. Efficient techniques for managing TCI states for communications may help to enhance communications efficiency and reliability, and may reduce communications latency.

SUMMARY

The described techniques relate to improved methods, systems, devices, and apparatuses that support downlink control information (DCI) size adjustment based on unified transmission configuration indicator (TCI) state. Generally, the described techniques provide for a user equipment (UE) receiving a first control message, which may be an example of a medium access control layer control element (MAC-CE) message, that maps at least one TCI codepoint to two TCI states. The UE may receive a DCI message that schedules an uplink shared channel transmission. The DCI message may include a first set of fields specifying configuration information for a first set of repetitions of the uplink shared channel transmission. Based on the first control message including the mapping, the DCI message may also include an additional second set of fields specifying configuration information for a second set of repetitions of the uplink shared channel transmission. The UE may transmit the uplink shared channel transmission in accordance with the DCI message. In some examples, the inclusion of the additional second set of fields may be based on a beam indication DCI including an indication of two TCI states.

A method for wireless communications at a user equipment (UE) is described. The method may include receiving a first control message including a mapping of at least one transmission configuration indicator codepoint to two transmission configuration indicator states, receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and transmitting the uplink shared channel transmission in accordance with the downlink control information message.

An apparatus for wireless communications at a UE is described. The apparatus may include a processor, memory coupled with the processor, and instructions stored in the memory. The instructions may be executable by the processor to cause the apparatus to receive a first control message including a mapping of at least one transmission configuration indicator codepoint to two transmission configuration indicator states, receive a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and transmit the uplink shared channel transmission in accordance with the downlink control information message.

Another apparatus for wireless communications at a UE is described. The apparatus may include means for receiving a first control message including a mapping of at least one transmission configuration indicator codepoint to two transmission configuration indicator states, means for receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and means for transmitting the uplink shared channel transmission in accordance with the downlink control information message.

A non-transitory computer-readable medium storing code for wireless communications at a UE is described. The code may include instructions executable by a processor to receive a first control message including a mapping of at least one transmission configuration indicator codepoint to two transmission configuration indicator states, receive a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and transmit the uplink shared channel transmission in accordance with the downlink control information message.

Some examples of the method, apparatuses, and non-transitory computer-readable medium described herein may further include operations, features, means, or instructions for receiving, after receiving the first control message, a first downlink control information message that indicates that the two transmission configuration indicator states may be active, where the second downlink control information message includes the additional second set of fields based on the first downlink control information message indicating that the two transmission configuration indicator states may be active.

In some examples of the method, apparatuses, and non-transitory computer-readable medium described herein, transmitting the uplink shared channel transmission may include operations, features, means, or instructions for transmitting the uplink shared channel transmission using one transmission configuration indicator state of the two transmission configuration indicator states that may be listed first in the mapping or that may have a lower transmission configuration indicator state identifier, where the one transmission configuration indicator state may be used based on the UE being configured with a single sounding reference signal resource set.

Some examples of the method, apparatuses, and non-transitory computer-readable medium described herein may further include operations, features, means, or instructions for applying, to the uplink shared channel transmission, a beam associated with the one transmission configuration indicator state for the single sounding reference signal resource set.

Some examples of the method, apparatuses, and non-transitory computer-readable medium described herein may further include operations, features, means, or instructions for transmitting a feedback message that acknowledges the first downlink control information message, where the additional second set of fields may be included in the second downlink control information message based on the first downlink control information message being received after a threshold number of symbols from transmission of the feedback message.

Some examples of the method, apparatuses, and non-transitory computer-readable medium described herein may further include operations, features, means, or instructions for receiving a radio resource control message that includes an indication of the threshold number of symbols.

Some examples of the method, apparatuses, and non-transitory computer-readable medium described herein may further include operations, features, means, or instructions for receiving a third downlink control information message during a time duration after receipt of the first downlink control information message and before a period during which the two transmission configuration indicator states may be active, where the third downlink control information message schedules a second uplink shared channel transmission, determining that the third downlink control information message does not include the additional second set of fields based on the third downlink control information message being received during the time duration, and transmitting the second uplink shared channel transmission in accordance with the third downlink control information message.

In some examples of the method, apparatuses, and non-transitory computer-readable medium described herein, transmitting the second uplink shared channel transmission may include operations, features, means, or instructions for transmitting the second uplink shared channel transmission using one transmission configuration indicator state of the two transmission configuration indicator states that may be listed first in the mapping or that may have a lower transmission configuration indicator state identifier, where the one transmission configuration indicator state may be used based on the third downlink control information message being received during the time duration and not including the additional second set of fields.

Some examples of the method, apparatuses, and non-transitory computer-readable medium described herein may further include operations, features, means, or instructions for applying, to a repetition of the second uplink shared channel transmission, a first sounding reference signal resource set of two sounding reference signal resource sets configured at the UE, where the first sounding reference signal resource set may be applied based on the third downlink control information message being received during the time duration and not including the additional second set of fields.

Some examples of the method, apparatuses, and non-transitory computer-readable medium described herein may further include operations, features, means, or instructions for applying, as values for the additional second set of fields that may be not included in the third downlink control information message, a set of fixed values, where the second uplink shared channel transmission may be transmitted in accordance with the third downlink control information message and the set of fixed values applied for the additional second set of fields.

Some examples of the method, apparatuses, and non-transitory computer-readable medium described herein may further include operations, features, means, or instructions for receiving, after receiving the first control message, a first downlink control information message that includes an indication of a transmission configuration indicator codepoint that may be mapped to a single transmission configuration indicator state, determining that the second downlink control information message may be received during a period in which the two transmission configuration indicator states may be active, and determining that the uplink shared channel transmission may be scheduled during a period during which the single transmission configuration indicator state may be active, where the uplink shared channel transmission may be transmitted in accordance with the second downlink control information message.

In some examples of the method, apparatuses, and non-transitory computer-readable medium described herein, transmitting the uplink shared channel transmission may include operations, features, means, or instructions for transmitting, based on the uplink shared channel transmission being scheduled during a period which the single transmission configuration indicator state may be active, the uplink shared channel transmission using the first set of fields specifying the configuration information for the first set of repetitions and without applying the additional second set of fields.

In some examples of the method, apparatuses, and non-transitory computer-readable medium described herein, transmitting the uplink shared channel transmission may include operations, features, means, or instructions for applying, as values for the additional second set of fields that may be included in the second downlink control information message and based on the uplink shared channel transmission being scheduled during the period which the single transmission configuration indicator state may be active, a set of fixed values, where the uplink shared channel transmission may be transmitted in accordance with the second downlink control information message and the set of fixed values applied for the additional second set of fields.

Some examples of the method, apparatuses, and non-transitory computer-readable medium described herein may further include operations, features, means, or instructions for applying, to a repetition of the uplink shared channel transmission, a first sounding reference signal resource set of two sounding reference signal resource sets configured at the UE, where the first sounding reference signal resource set may be applied based on the second downlink control information message being received during the period and not including the additional second set of fields.

Some examples of the method, apparatuses, and non-transitory computer-readable medium described herein may further include operations, features, means, or instructions for receiving a radio resource control message that configures a first sounding reference signal resource set to be applied to the first set of repetitions and a second sounding reference signal resource set to be applied to the second set of repetitions, where the downlink control information message includes the additional second set of fields based on the radio resource control message configuring the first sounding reference signal resource set and the second sounding reference signal resource set.

In some examples of the method, apparatuses, and non-transitory computer-readable medium described herein, the additional second set of fields include a sounding reference signal resource set indicator field, a second sounding reference signal resource indicator field, a second transmitted precoding matrix index (TPMI) field, a second phase tracking reference signal (PTRS) demodulation reference signal (DMRS) association field, a second transmit power control (TPC) command field, or a combination thereof.

Some examples of the method, apparatuses, and non-transitory computer-readable medium described herein may further include operations, features, means, or instructions for transmitting a feedback message that acknowledges the first control message, where the additional second set of fields may be included in the downlink control information message based on the downlink control information message being received after a threshold time from transmission of the feedback message.

In some examples of the method, apparatuses, and non-transitory computer-readable medium described herein, the threshold time may be 3 ms.

In some examples of the method, apparatuses, and non-transitory computer-readable medium described herein, the two transmission configuration indicator states may be joint transmission configuration indicator states or both uplink transmission configuration indicator states.

Some examples of the method, apparatuses, and non-transitory computer-readable medium described herein may further include operations, features, means, or instructions for applying a first transmission configuration indicator state of the two transmission configuration indicator states to the first set of repetitions and applying a second transmission configuration indicator state the two transmission configuration indicator states to the second set of repetitions, where the first set of repetitions and the second set of repetitions may be transmitted in accordance with the downlink control information message.

A method for wireless communication at a base station is described. The method may include transmitting, to a UE, a first control message including a mapping of at least one transmission configuration indicator codepoint to two transmission configuration indicator states, transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and receiving, from the UE, the uplink shared channel transmission in accordance with the downlink control information message.

An apparatus for wireless communication at a base station is described. The apparatus may include a processor, memory coupled with the processor, and instructions stored in the memory. The instructions may be executable by the processor to cause the apparatus to transmit, to a UE, a first control message including a mapping of at least one transmission configuration indicator codepoint to two transmission configuration indicator states, transmit, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and receive, from the UE, the uplink shared channel transmission in accordance with the downlink control information message.

Another apparatus for wireless communication at a base station is described. The apparatus may include means for transmitting, to a UE, a first control message including a mapping of at least one transmission configuration indicator codepoint to two transmission configuration indicator states, means for transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and means for receiving, from the UE, the uplink shared channel transmission in accordance with the downlink control information message.

A non-transitory computer-readable medium storing code for wireless communication at a base station is described. The code may include instructions executable by a processor to transmit, to a UE, a first control message including a mapping of at least one transmission configuration indicator codepoint to two transmission configuration indicator states, transmit, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping, and receive, from the UE, the uplink shared channel transmission in accordance with the downlink control information message.

Some examples of the method, apparatuses, and non-transitory computer-readable medium described herein may further include operations, features, means, or instructions for transmitting, after transmitting the first control message, a first downlink control information message that indicates that two transmission configuration indicator states may be active, where the second downlink control information message includes the additional second set of fields based on the first downlink control information message indicating that the two transmission configuration indicator states may be active.

In some examples of the method, apparatuses, and non-transitory computer-readable medium described herein, receiving the uplink shared channel transmission may include operations, features, means, or instructions for receiving the uplink shared channel transmission in accordance with one transmission configuration indicator state of the two transmission configuration indicator states that may be listed first in the mapping or that may have a lower transmission configuration indicator state identifier, where the one transmission configuration indicator state may be used based on the UE being configured with a single sounding reference signal resource set.

Some examples of the method, apparatuses, and non-transitory computer-readable medium described herein may further include operations, features, means, or instructions for determining that the UE may be to apply, to the uplink shared channel transmission, a beam associated with the one transmission configuration indicator state for the single sounding reference signal resource set.

Some examples of the method, apparatuses, and non-transitory computer-readable medium described herein may further include operations, features, means, or instructions for receiving, from the UE, a feedback message that acknowledges the first downlink control information message, where the additional second set of fields may be included in the second downlink control information message based on the first downlink control information message being received after a threshold number of symbols from transmission of the feedback message.

Some examples of the method, apparatuses, and non-transitory computer-readable medium described herein may further include operations, features, means, or instructions for transmitting a radio resource control message that includes an indication of the threshold number of symbols.

Some examples of the method, apparatuses, and non-transitory computer-readable medium described herein may further include operations, features, means, or instructions for transmitting a third downlink control information message during a time duration after transmission of the first downlink control information message and before a period during which the two transmission configuration indicator states may be active, where the third downlink control information message schedules a second uplink shared channel transmission, where the third downlink control information message does not include the additional second set of fields based on the third downlink control information message being transmitted during the time duration and receiving the second uplink shared channel transmission in accordance with the third downlink control information message.

In some examples of the method, apparatuses, and non-transitory computer-readable medium described herein, receiving the second uplink shared channel transmission may include operations, features, means, or instructions for receiving the second uplink shared channel transmission in accordance with one transmission configuration indicator state of the two transmission configuration indicator states that may be listed first in the mapping or that may have a lower transmission configuration indicator state identifier, where the one transmission configuration indicator state may be used based on the third downlink control information message being transmitted during the time duration and not including the additional second set of fields.

Some examples of the method, apparatuses, and non-transitory computer-readable medium described herein may further include operations, features, means, or instructions for determining that the UE may be to apply to a repetition of the second uplink shared channel transmission, a first sounding reference signal resource set of two sounding reference signal resource sets configured at the UE, where the first sounding reference signal resource set may be to be applied based on the third downlink control information message being received during the time duration and not including the additional second set of fields.

Some examples of the method, apparatuses, and non-transitory computer-readable medium described herein may further include operations, features, means, or instructions for determining that the UE may be to apply, as values for the additional second set of fields that may be not included in the third downlink control information message, a set of fixed values, where the second uplink shared channel transmission may be transmitted in accordance with the third downlink control information message and the set of fixed values applied for the additional second set of fields.

Some examples of the method, apparatuses, and non-transitory computer-readable medium described herein may further include operations, features, means, or instructions for transmitting, after transmitting the first control message, a first downlink control information message that includes an indication of a transmission configuration indicator codepoint that may be mapped to a single transmission configuration indicator state, where the second downlink control information message may be transmitted during a period in which the two transmission configuration indicator states may be active and determining that the uplink shared channel transmission may be scheduled during a period during which the single transmission configuration indicator state may be active, where the uplink shared channel transmission may be received in accordance with the second downlink control information message.

Some examples of the method, apparatuses, and non-transitory computer-readable medium described herein may further include operations, features, means, or instructions for determining, based on the uplink shared channel transmission being scheduled during a period which the single transmission configuration indicator state may be active, that the UE may be to apply the first set of fields specifying the configuration for the first set of repetitions and without applying the additional second set of fields.

Some examples of the method, apparatuses, and non-transitory computer-readable medium described herein may further include operations, features, means, or instructions for determining, based on the uplink shared channel transmission being scheduled during the period which the single transmission configuration indicator state may be active, that the UE may be to apply, as values for the additional second set of fields that may be included in the second downlink control information message, a set of fixed values, where the uplink shared channel transmission may be received in accordance with the second downlink control information message and the set of fixed values applied for the additional second set of fields.

Some examples of the method, apparatuses, and non-transitory computer-readable medium described herein may further include operations, features, means, or instructions for determining, based on the uplink shared channel transmission being scheduled during the period which the single transmission configuration indicator state may be active, that the UE may be to apply, to a repetition of the uplink shared channel transmission, a first sounding reference signal resource set of two sounding reference signal resource sets configured at the UE.

Some examples of the method, apparatuses, and non-transitory computer-readable medium described herein may further include operations, features, means, or instructions for transmitting, to the UE, a radio resource control message that configures a first sounding reference signal resource set to be applied to the first set of repetitions and a second sounding reference signal resource set to be applied to the second set of repetitions, where the downlink control information message includes the additional second set of fields based on the radio resource control message configuring the first sounding reference signal resource set and the second sounding reference signal resource set.

In some examples of the method, apparatuses, and non-transitory computer-readable medium described herein, the additional second set of fields include a sounding reference signal resource set indicator field, a second sounding reference signal resource indicator field, a second transmitted precoding matrix index (TPMI) field, a second phase tracking reference signal (PTRS) DMRS association field, a second transmit power control (TPC) command field, or a combination thereof.

Some examples of the method, apparatuses, and non-transitory computer-readable medium described herein may further include operations, features, means, or instructions for receiving, from the UE, a feedback message that acknowledges the first control message, where the additional second set of fields may be included in the downlink control information message based on the downlink control information message being received after a threshold time from transmission of the feedback message.

In some examples of the method, apparatuses, and non-transitory computer-readable medium described herein, the threshold time may be 3 ms.

In some examples of the method, apparatuses, and non-transitory computer-readable medium described herein, the two transmission configuration indicator states may be joint transmission configuration indicator states or both uplink transmission configuration indicator states.

Some examples of the method, apparatuses, and non-transitory computer-readable medium described herein may further include operations, features, means, or instructions for determining that the UE may be to apply a first transmission configuration indicator state of the two transmission configuration indicator states to the first set of repetitions and determining that the UE may be to apply a second transmission configuration indicator state of the two transmission configuration indicator states to the second set of repetitions, where the first set of repetitions and the second set of repetitions may be received in accordance with the downlink control information message.

DETAILED DESCRIPTION

Figure 1:
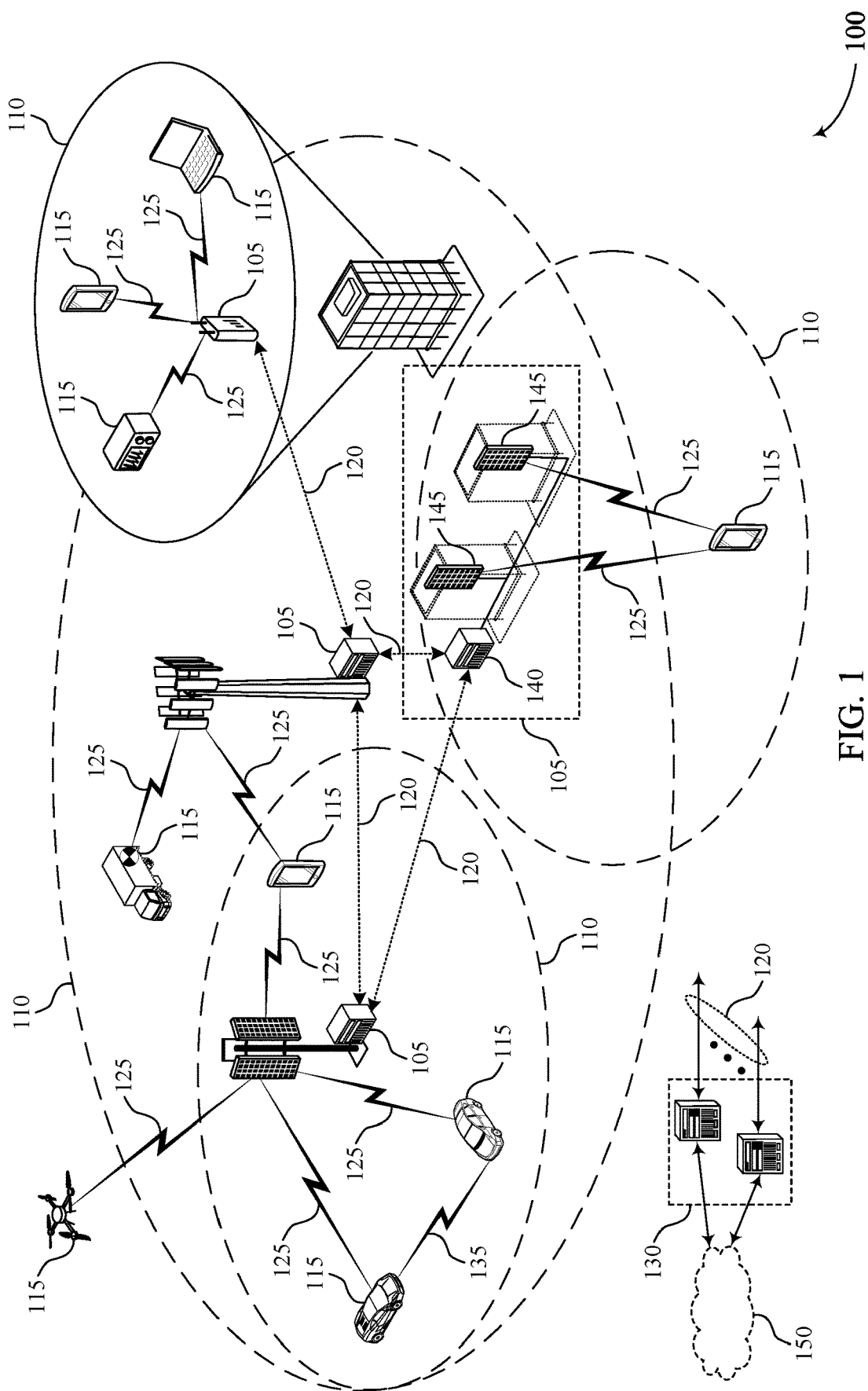
FIG. 1 illustrates an example of a wireless communications system that supports downlink control information (DCI) size adjustment based on unified transmission configuration indicator (TCI) state in accordance with examples as disclosed herein.

Wireless communications systems may support beamforming for improved communication reliability and efficiency. For example, the utilization of directional beams for communication may reduce interference with other communications in a wireless communications systems. In some cases, a beam that is used for communication may be indicated to a transmitting device. For example, base station may use various beam indication techniques in order to indicate a beam that a user equipment (UE) is to use for receiving communications and/or for transmitting communications. The beam indication may be transmitted using one or more control messages (e.g., a radio resource control (RRC) message, medium access control layer control element (MAC-CE) message, and a downlink control information (DCI) message). According to some techniques, a transmission configuration indicator (TCI) state is used to indicate a beam that a UE is to use for downlink signals or channels, and spatial relation information is used to indicate a beam that a UE is to use for uplink signals or channels. Additionally or alternatively, two TCI states may be indicated to the UE, and the two TCI states may correspond to two beams that the UE is to use for joint downlink or uplink communications or to a first beam that the UE is to use for uplink communications and a second beam that the UE is to use for downlink communications. The use of TCI to indicate joint uplink or downlink states, or an uplink and a downlink TCI state, may be referred to as unified TCI.

Wireless communications may also support repetitions of messages or channels in order in order to improve communication reliability and efficiency. That is, by repeating transmissions, a receiving device, such as a UE or base station, may have a higher probability of successful receipt and decoding of the transmission. In some cases, different sets of repetitions may be configured for additional communication reliability and efficiencies. For example, a first set of repetitions of a physical uplink control channel (PUCCH) or a physical uplink shared channel (PUSCH) may be configured with different transmission parameters (e.g., different spatial relation information (beams) and/or different power control parameters). This technique may be used in multiple transmission-reception point (mTRP) schemes such that a respective set of repetitions is transmitted to a different TRP. To schedule different sets of repetitions, DCI may be expanded to include additional fields to configure the additional set of repetitions. In some cases, the presence of these additional fields may depend on whether two sounding reference signal resources sets are configured at the UE.

In some cases, the utilization of the unified TCI (e.g., indication of two TCI states) may be extended to mTRP schemes such that two downlink TCI states, two uplink TCI states, two downlink TCI states and two uplink TCI states, and two joint downlink or uplink TCI states may be used for different channels or signals. With the extension of the unified TCI for mTRP schemes, the additional DCI fields (e.g., for configuring a second set of repetitions of a channel/signal) may be used when two TCI states (e.g., joint or uplink) are configurable or indicated to be applied to a channel (e.g., PUSCH). More particularly, if the two TCI states are not indicated or configurable, then the inclusion of these additional fields in the DCI may be inefficient or waste resources.

Techniques described herein support using a DCI that includes the additional fields or not dependent on whether two TCI states are configurable or indicated to a UE. For example, according to implementations described herein, if a MAC-CE message activates two TCI states (e.g., the MAC-CE message maps two TCI states to a single TCI codepoint), then a scheduling DCI (e.g., a DCI format that schedules a PUSCH) may include the additional fields. In contrast, if the MAC-CE message maps TCI codepoints to one TCI state, then the scheduling DCI may not include the additional fields. In the same or an alternative implementations, whether the scheduling DCI includes the additional fields or not may depend on whether another DCI message (e.g., a DCI message with a beam indication or TCI codepoint indication) indicates a TCI codepoint that is mapped to two TCI states (which are uplink or joint TCI states). In contrast, if the beam indication DCI message does not indicate a TCI codepoint that is mapped to two TCI states, then the scheduling DCI may not include the additional fields. Thus, the size of the scheduling DCI may be based on a beam indication with a unified TCI. Accordingly, these techniques may support reduced DCI resource utilization, thereby increasing resource utilization efficiency and wireless communication throughput.

Implementations described herein also support UE or base station operation when the additional TCI fields are configurable after a DCI scheduling a PUSCH is received or cases where the additional TCI fields are not configurable after a DCI scheduling a PUSCH is received. Additionally, techniques described herein support DCI size adjustment for PDSCH and PUCCH repetition. These and other techniques are described in further detail with respect to the figures.

Aspects of the disclosure are initially described in the context of wireless communications systems. Aspects of the disclosure are further illustrated and described by and with reference to TCI multiplexing schemes, TCI state indications and associated DCI indications, and process flows. Aspects of the disclosure are further illustrated and described with reference to apparatus diagrams, system diagrams, and flowcharts that relate to DCI size adjustment based on unified TCI state.

FIG. 1 illustrates an example of a wireless communications system 100 that supports DCI size adjustment based on unified TCI state in accordance with examples as disclosed herein. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support repetition of various channels and signal in to improve communication reliability and efficiency. For example, a UE 115 may be configured to repeat an uplink shared channel transmission such as to increase the likelihood that the uplink shared channel transmission is received and decoded by a base station 105. These repetition techniques may be used in mTRP schemes such that sets of repetitions may be transmitted with different configurations. Additionally, a UE 115 may be configured with multiple TCI states for communications (e.g., based on a configured TCI codepoint that is associated with two TCI states).

Techniques described herein support DCI size adjustment for cases when the unified TCI schemes are extended to mTRP channel scheduling. A DCI that schedules an uplink shared channel transmission may or may not include additional fields (e.g., for configuring a set of repetitions) dependent on whether the UE 115 is configured with two TCI states (e.g., joint or uplink). As such, in cases where the UE 115 is not configured with two TCI states, the DCI may not utilize communication resources for fields that are not being used for configurations. Accordingly, these techniques may be used to increase communication reliability and throughput.

Figure 2:
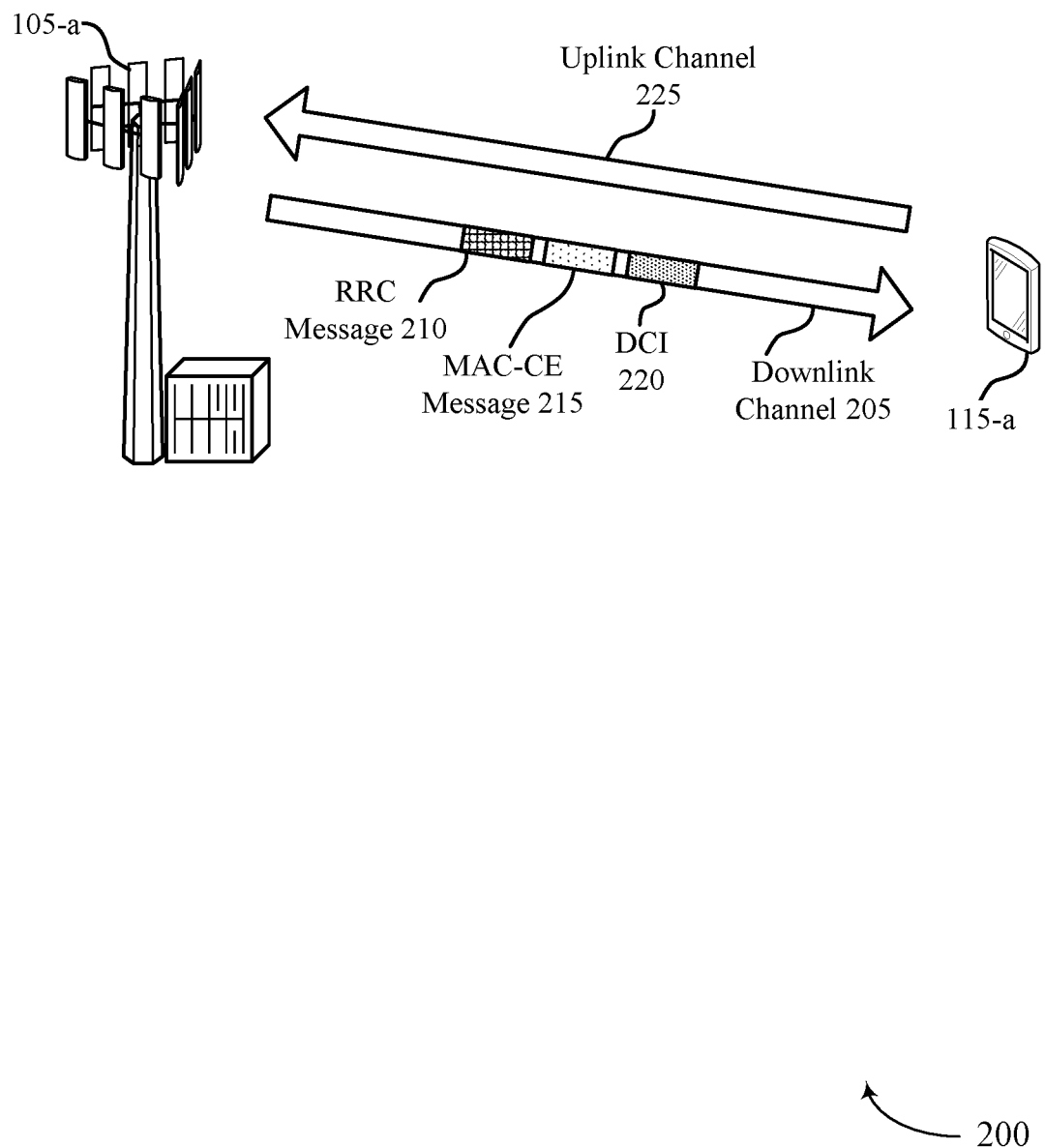
FIG. 2 illustrates an example of a wireless communications system that supports DCI size adjustment based on unified TCI state in accordance with examples as disclosed herein.

FIG. 2 illustrates an example of a wireless communications system 200 that supports DCI size adjustment based on unified TCI state in accordance with examples as disclosed herein. The wireless communications system 200 may be an example of the wireless communications system 100. For example, the wireless communications system 200 may include a UE 115-*a* and a base station 105-*a*, which may be examples of the UE 115 and the base station 105 as described with reference to FIG. 1. While examples are discussed herein, any number of devices and device types may be used to accomplish implementations described in the present disclosure. As used herein, the term beam configuration may be referred to as a TCI state, and the term TCI state may be referred to as a beam configuration.

The base station 105-*a* and the UE 115-*a* may communicate via a downlink channel 205 and an uplink channel 225. In some wireless communications systems, such as 5G or NR, different types of TCI states may be used to improve channel utilization between wireless devices. For example, a wireless communications system may support joint TCI states for both downlink and uplink signaling using a unified TCI framework. In some systems, wireless communications systems may support a single TCI codepoint that is mapped to multiple TCI states, such as one downlink TCI state and one uplink TCI state, two downlink TCI states (joint TCI states), or two UL TCI states (joint TCI states).

In some implementations, the UE 115-a may receive a configuration of TCI states from the base station 105-a, such as in a RRC message 210 via RRC signaling. The UE 115-a may receive a MAC-CE message 215 from the base station 105-a associated with the configuration of TCI states, where the MAC-CE message 215 may activate a subset of configured TCI states along with a mapping to TCI codepoints. In accordance with various aspects discussed herein, control information such as DCI 220 may indicate a particular TCI state codepoint, for use in communications with the base station 105 a, where the TCI codepoint indicates a particular TCI state or two or more particular TCI states from the subset of activated TCI states (based on the MAC-CE message 215) for use in communications with the base station 105-a.

In some implementations, a DCI message 220 may schedule repetitions of various channels. For example, a DCI format 0_1 or 0_2 may be used to schedule a PUSCH repetitions. These DCI formats may include additional fields that are used for configurations for a subset of repetitions of a PUSCH. The presence of these additional fields may be based on a RRC configuration (e.g., via RRC message 210) via a configuration of two SRS resources sets of the DCI format. However, when unified TCI schemes are used, these additional fields may be used if two TCI states (joint or UL) can be indicated as to be applied for PUSCH transmissions. As such, whether these additional fields are used may be dependent on whether the MAC-CE message 215, which activates the TCI states, maps two TCI states (e.g., UL or joint) to a TCI codepoint or whether the DCI format that indicates one of the TCI codepoints (e.g., DCI format 1_1 or 1_2 with or without a downlink assignment) that is mapped to two TCI states (e.g., uplink or joint). Accordingly, techniques described herein support adjustment of the scheduling DCI to include or not include these additional fields based on whether the two TCI states are configured for at least one TCI codepoint or indicated via a beam indication DCI. As such, these techniques may support improve communication resource utilization efficiency and increased throughput in the wireless communications system.

Figure 3:
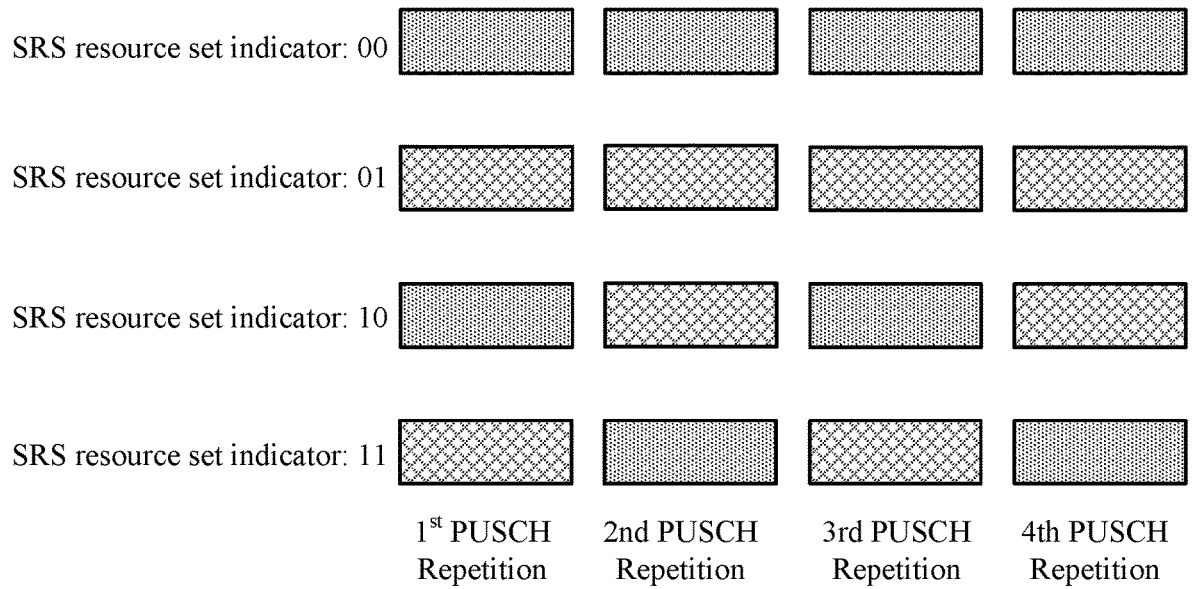
FIG. 3 illustrates an example of multiplexing schemes for TCI states in accordance with examples as disclosed herein.
Figure 3:
Figure 3:
Figure 3:

FIG. 3 illustrates an example of multiplexing schemes 300 for TCI states in accordance with examples as disclosed herein. The multiplexing schemes 300 may implement or be implemented by one or more aspects of the wireless communications systems 100 or 200. For example, the multiplexing schemes 300 may be utilized by one or more TRPs (e.g., base stations or TRPs associated with a base station), and a UE, which may be examples of corresponding devices as described with reference to FIGS. 1 and 2.

In the example of FIG. 3, a first set of PUSCH repetitions 305 for a first TRP and a second set of PUSCH repetitions for a second TRP may be configured at a UE for mTRP PUSCH schemes. The first set of PUSCH repetitions 305 may be associated with a first SRS resource set and may be transmitted using a first beam, a first set of power control parameters, and a first precoding. The second set of PUSCH repetitions 310 may be associated with a second SRS resource set and may be transmitted using a second beam, a second set of power control parameters, and a second precoding. The DCI message that schedules the PUSCH repetitions (e.g., DCI format 0_1 or 0_2) may include a first set of fields for configuring the first set of repetitions and a second set of fields for configuring the second set of repetitions.

For example, the DCI that schedules a mTRP PUSCH may include a sounding reference signal (SRS) set indicator field, a second sounding reference signal resource indicator (SRI) field, a second transmitted precoding matrix index (TPMI) field, a second phase tracking reference signal (PTRS) demodulation reference signal (DMRS) association field, a second transmit power control (TPC) command field, or a combination of these. The SRS resource set indicator field may include two bits that indicate whether PUSCH repetitions are associated with the first SRS resource set (00), with the second SRS resource set (01), with both SRS resource sets and the first repetition in time associated with the first SRS resource set (10), and with both SRS resource sets and the first repetition in time associated with the second SRS resource set (11). The second SRI field may be up to three bits (e.g., depending on number of SRS resources in the second SRS resource set, and depending on codebook-based versus non-codebook based PUSCH) for indicating one or more SRS resources from the second SRS resource set (for the second set of repetitions 310). The second TPMI field may include up to five bits (depending on number of antenna ports, max rank, coherent, partial-coherent, or non-coherent codebook subset) for indicating the precoding for the PUSCH repetitions associated with the second SRS resource set. The second PTRS-DMRS association field may include two bits for a max rank greater than two. The second TPC command fields may include two bits, and the presence of the TPC command filed may be RRC configured per DCI format.

Accordingly, in total, the DCI size may be increased by up to fourteen bits, which may result in significant DCI overhead that is used for mTRP scheduling. However, as described herein, when unified TCI states are used, these fields may be used when two TCI states can be indicated for application for PUSCH transmissions, which may depend on whether the MAC-CE maps at least one TCI codepoint to two TCI states and/or whether a beam indication DCI indicates a TCI codepoint that is mapped to two TCI states (e.g., uplink or joint). Accordingly, techniques described herein support DCI size adjustment based on whether two TCI states are applicable to PUSCH scheduling.

Figure 4:
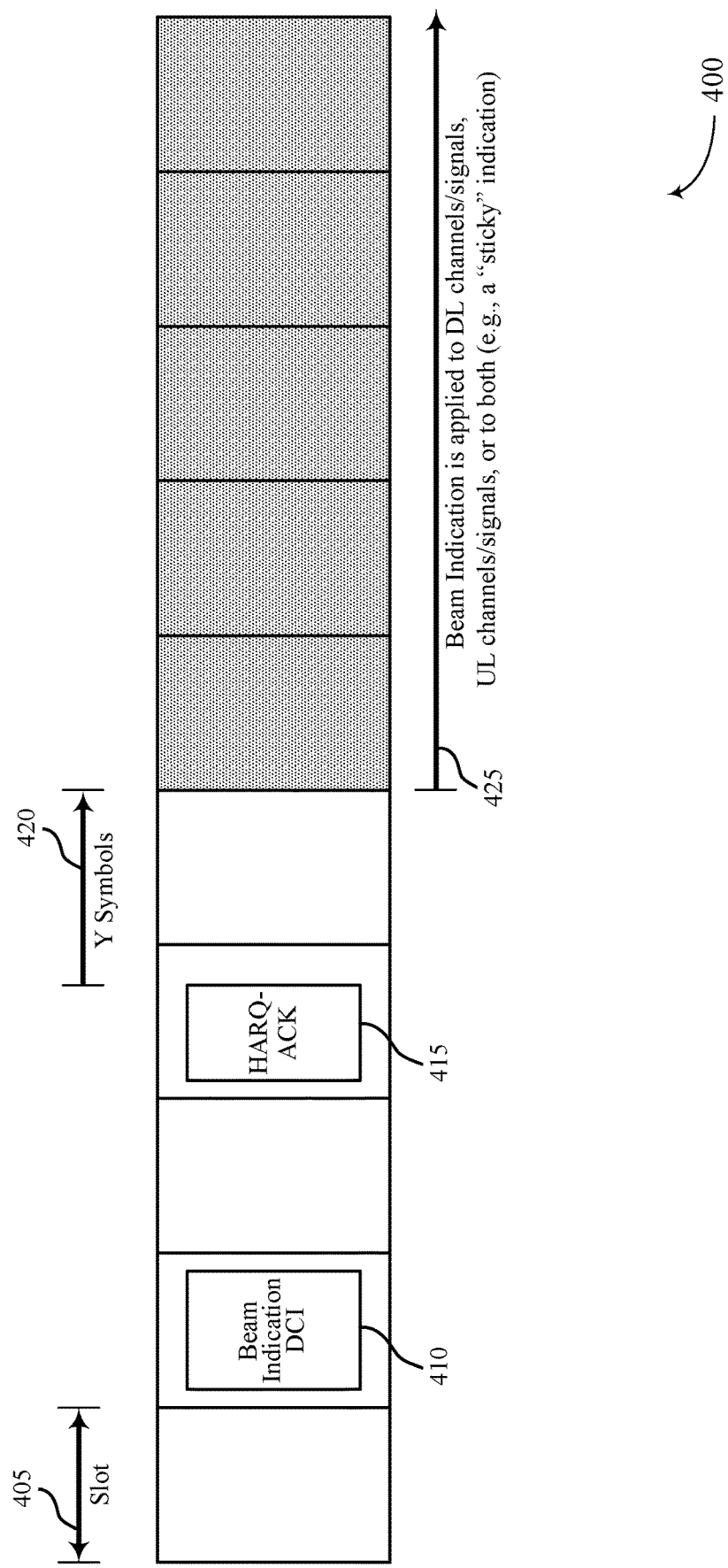
FIG. 4 illustrates an example of a TCI state timing that supports DCI size adjustment based on unified TCI state in accordance with examples as disclosed herein.

FIG. 4 illustrates an example of a TCI state timing 400 that supports DCI size adjustment based on unified TCI state in accordance with examples as disclosed herein. The TCI state timing 400 may be implemented by one or more aspects of the wireless communications systems 100 or 200. For example, the TCI state timing 400 may be utilized by one or more TRPs (e.g., base stations or TRPs associated with a base station), and a UE, which may be examples of corresponding devices as described with reference to FIGS. 1 and 2.

In the example of FIG. 4, a UE and TRP may communicate in slots 405, in which one of the slots 405 may include a beam indication DCI 410 that includes a TCI (field) codepoint. As discussed herein, the TCI (field) codepoint may be mapped to one or multiple TCI states (e.g., one or more uplink TCI states, one or more downlink TCI states, or any combinations thereof). For example, one TCI field codepoint may represent a joint downlink/uplink TCI state mapped to one TCI codepoint, which may be used for joint downlink/uplink beam indication. In another example, one TCI field codepoint may represent a pair with a downlink TCI state and uplink TCI state, which may be used for separate downlink/uplink beam indication. In other examples, one TCI field codepoint may represent only a downlink TCI state, which may be used for downlink beam indication, or one TCI field codepoint may represent only an uplink TCI state, which may be used for uplink beam indication.

As described herein, MAC-CE messaging may be used to activate a number of RRC configured TCI states, and map the TCI states to TCI codepoints. In some cases, if the MAC-CE indicates the mapping to only a single TCI field codepoint, the MAC-CE may serve as a beam indication, and a separate beam indication in DCI may not be used. In such cases, the beam indication may be applied three milliseconds after a HARQ-acknowledgment (ACK) message transmitted in response to the MAC-CE message.

Additionally, a UE that receives a beam indication DCI 410 (e.g., DCI format 1_1 or 1_2 with or without PDSCH scheduling) with the TCI field codepoint may transmit a feedback indication, such as a HARQ-ACK 415, to a base station or TRP that indicates successful receipt of the beam indication DCI 410. In some cases, the beam indication provided in the beam indication DCI 410 may be applied to communications starting a predetermined time period 420 (e.g., Y symbols) after the HARQ-ACK 415. In some cases, the predetermined time period 420 may be applied in the first slot that is at least Y symbols (e.g., which is RRC-configured based on UE capability) after the last symbol of a control channel transmission (e.g., a physical uplink control channel (PUCCH) transmission) carrying the HARQ-ACK 415. In some cases, the beam indication (e.g., via MAC-CE or DCI) may be a "sticky" indication in that it is not related to the scheduled shared channel communication (e.g., a physical downlink shared channel (PDSCH) transmission), and it is not a one-time indication. When the beam indication is applied, it remains the same for the applicable channels/signals until changed (e.g., another MAC-CE or DCI format 1_1/1_2 changes the beam), as indicated by period 425 in FIG. 4. In some cases, the beam indication may be common for multiple downlink channels/signals (e.g., PDSCH, PDCCH, CSI-RS) and/or multiple uplink channels/signals (PUSCH, PUCCH, SRS).

As discussed herein, in some cases, whether a scheduling DCI includes additional fields for configuration of a second set of PUSCH repetitions in mTRP schemes may depend on whether a TCI (field) codepoint is mapped to two TCI states (e.g., uplink or joint) via a MAC-CE message. Additionally or alternatively, whether the scheduling DCI includes the additional fields may be depend on whether the beam indication DCI 410 indicates two TCI states (e.g., via a TCI codepoint mapped to the two TCI states).

Figure 5:
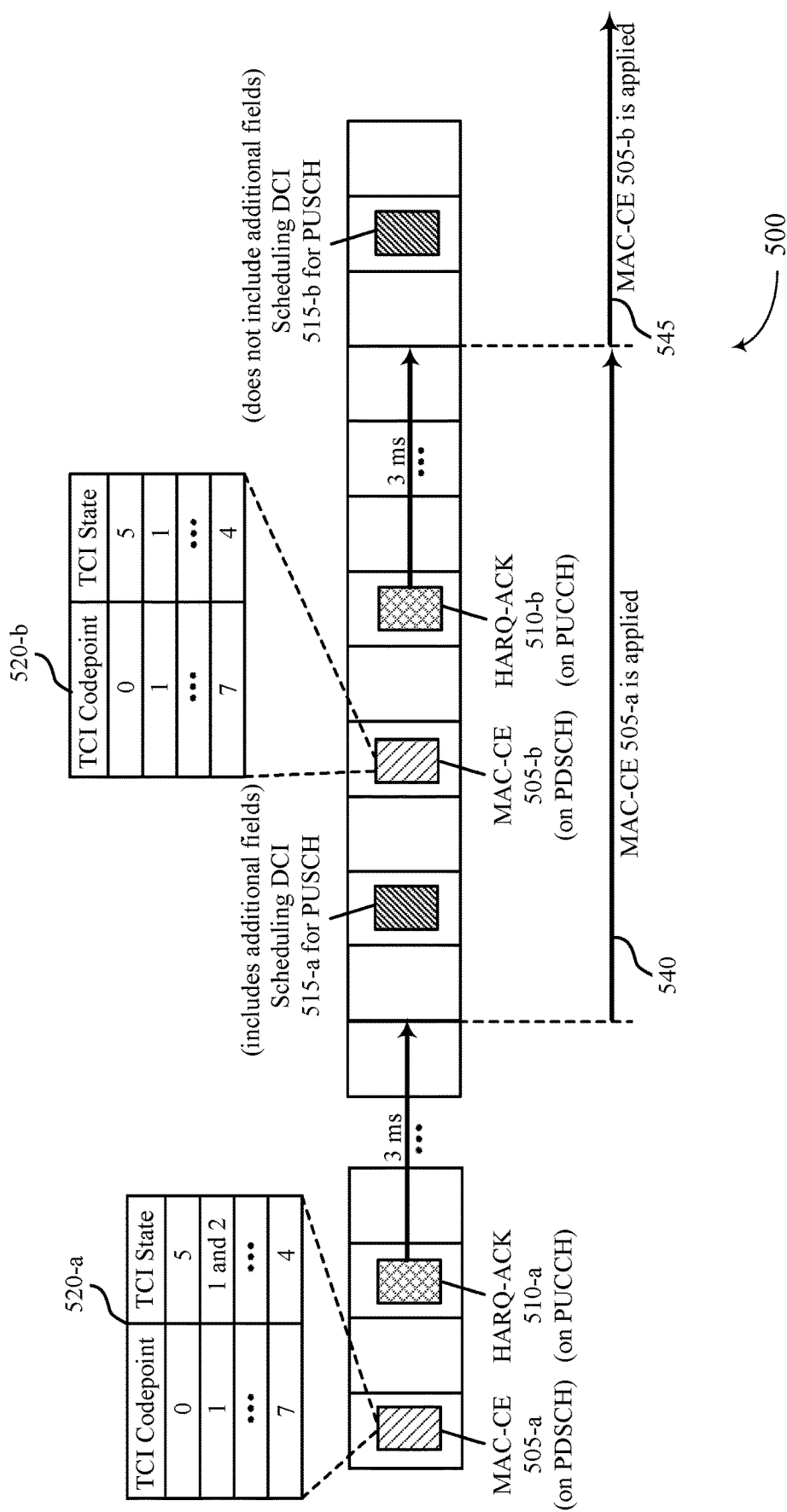
FIG. 5 illustrates an example of TCI state indications that support DCI size adjustment in accordance with examples as disclosed herein.

FIG. 5 illustrates examples of TCI state indications 500 that support DCI size adjustment in accordance with examples as disclosed herein. The TCI state indications 500 may be implemented by one or more aspects of the wireless communications systems 100 or 200. For example, the TCI state indications 500 may be utilized by one or more TRPs (e.g., base stations or TRPs associated with a base station), and a UE, which may be examples of corresponding devices as described with reference to FIGS. 1 and 2.

In the example of FIG. 5 and according to a first option for DCI size adjustment, if a MAC-CE message 505-*a* that activates TCI states maps at least one TCI codepoint to two TCI states (which are UL or joint TCI states), the DCI format 0_1 or 0_2 for scheduling PUSCH is to include the additional fields corresponding to configuring a second set of repetitions of the PUSCH that may be scheduled by the DCI format 0_1 or 0_2. Otherwise, if all TCI codepoints are mapped to one TCI state (UL or joint), the DCI format 0_1 or 0_2 for scheduling PUSCH does not include the additional fields. As illustrated in FIG. 5, a first MAC-CE message 505-*a*, which may be transmitted using resources of a PDSCH, may activate TCI states and map TCI states to TCI codepoints. As illustrated in mapping 520-*a*, the MAC-CE message 505-*a* maps TCI codepoint 0 to TCI state 5, TCI codepoint 1 to TCI states 1 and 2, and TCI codepoint 7 to TCI state 4. The various TCI states that may be mapped may be RRC configured. In some cases, the RRC configuration may indicate whether the codepoints are DL TCI states, UL TCI states, or joint TCI states. Thus, the MAC-CE message 505-*a* maps TCI codepoint 1 to two TCI states, which may be examples of uplink or joint TCI states according to the RRC configuration.

According to implementations described herein, a DCI that schedules a PUSCH (e.g., scheduling DCI 515-*a*), while the TCI states indicated by the MAC-CE message 505-*a* are applied, is to include the additional fields for configuring a second set of repetitions (in addition to fields that used for configuring the first second of repetitions), because the MAC-CE message 505-*a* maps two TCI states to a TCI codepoint. Thus, the scheduling DCI 515-*a* includes the additional fields, and the additional fields may be a SRS resource set indicator field, a second SRI field, a second TPMI field, a second PTRS-DMRS association field (for max rank >2), a second TPC command field, or a combination thereof. Note that in addition to the MAC-CE mapping consideration, the additional fields in the scheduling DCI 515-*a* may also be dependent on whether the UE is configured with two SRS resource sets with usage set to codebook or non-codebook (e.g., via RRC configuration). That is, if the UE is not configured with two SRS resource sets, then the scheduling DCI 515-*a* may not include the additional fields. The scheduling DCI 515-*a* may schedule repetitions of a PUSCH using configurations described with respect to SRS resource set indicator codepoints 00 and 01 described in FIG. 3.

The time to assume a change to DCI formats 0_1/0_2 (from having the additional fields to not having the additional fields, or from not having the additional fields to having the additional fields, based on new MAC-CE) may be a threshold time period (e.g., 3 ms) after HARQ-ACK corresponding to the PDSCH that carries the MAC-CE. As such, the period in which the scheduling DCI 515-*a* is to have the additional fields (after the MAC-CE message 505-*a* maps the two TCI states to a single TCI codepoint) is 3 ms after the HARQ-ACK 510-*a* that corresponds to the PDSCH carrying the MAC-CE message 505-*a*. Thus, the MAC-CE message 505-*a* is applied (e.g., the TCI states are applied) during period 540 until a new MAC-CE message is received.

As illustrated in FIG. 5, after the scheduling DCI 515-*a* (including the additional fields) is received by a UE, a second MAC-CE message 505-*b* is received. The second MAC-CE message 505-*b* may include mapping 520-*b*. The mapping 520-*b* maps TCI codepoints to one TCI state. Accordingly, a scheduling DCI 520 received during a period 545 in which the MAC-CE 505-*b* is active (e.g., 3 ms after the PUCCH carrying the HARQ-ACK 510-*b* corresponding to the second MAC-CE message 505-*b*) does not include the additional fields. That is, because the second MAC-CE message 505-*b* does not map two TCI states to a single TCI codepoint, scheduling DCI 515-*b* does not include the additional fields.

Figure 6:
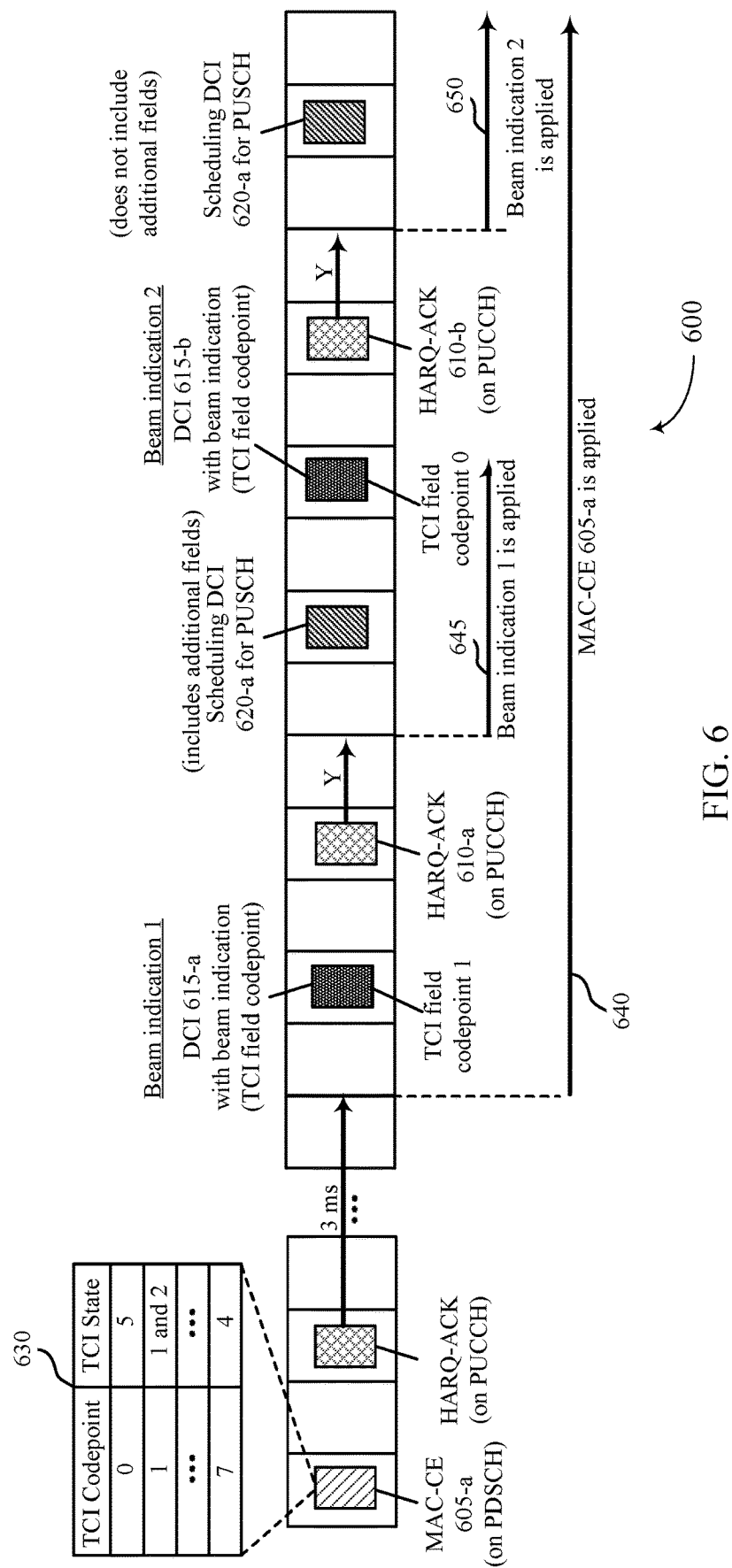
FIG. 6 illustrates an example of TCI state indications that support DCI size adjustment in accordance with examples as disclosed herein.

FIG. 6 illustrates examples of TCI state indications 600 that support DCI size adjustment in accordance with examples as disclosed herein. The TCI state indications 600 may be implemented by one or more aspects of the wireless communications systems 100 or 200. For example, the TCI state indications 600 may be utilized by one or more TRPs (e.g., base stations or TRPs associated with a base station), and a UE, which may be examples of corresponding devices as described with reference to FIGS. 1 and 2.

In the example of FIG. 6, and according to a second option for DCI size adjustment, if two TCI states (which are UL or joint TCI states) are indicated to be applied starting from a given time by a beam indication DCI (e.g., DCI formats 1_1 and 1_2), the DCI (e.g., DCI format 0_1 and 0_2) for scheduling PUSCH includes the additional fields. Otherwise, if only one TCI state (UL or joint) is indicated by the beam indication DCI, the scheduling DCI for PUSCH does not include the additional fields.

As illustrated in FIG. 6, a first MAC-CE message 605-*a*, which is received on resources of a PDSCH, may include a mapping 630 of TCI codepoints to one or more TCI states. The mapping 630 includes a mapping of TCI codepoint to TCI states 1 and 2. As described with respect to FIG. 5, the TCIs activated by the MAC-CE message 605-*a* may be active (e.g., indicatable) during a period 640 that is 3 ms after a HARQ-ACK 610-*a* corresponding to the PDSCH that carries the MAC-CE message 605-*a*. A beam indication DCI 615-*a* is received during the period 640 during which the MAC-CE message 605-*a* is active or applied. The beam indication DCI 615-*a* includes an indication of TCI field codepoint 1, which is mapped to two TCI states (1 and 2) via the MAC-CE message 605-*a*. The DCI 615-*a* may be referred to as a beam indication DCI as it includes the TCI field codepoint that corresponds to a TCI state (beam configuration).

Thus, because the DCI 615-*a* activates two TCI states (which are uplink or joint TCI states) via the TCI field codepoint, a scheduling DCI 620 received during a period 645 during which the beam indication of the DCI 615-*a* is applied includes the additional fields corresponding to configuration of a second set of PUSCH repetitions that may be scheduled by the scheduling DCI 620-*a*. Thus, the scheduling DCI 620-*a* may include the additional fields.

After the scheduling DCI 620-*a* is received, a second beam indication DCI 615-*b* is received. The second beam indication DCI 615-*a* indicates TCI field codepoint 0, which is mapped to one TCI state. Accordingly, a subsequent scheduling DCI 620 (received during a period 650 when the second beam indication is applied) does not include the additional fields. As such, the second scheduling DCI 620-*a* does not include the additional fields, as a second TCI state is not applicable to a scheduled PUSCH.

In some examples, the option illustrated in FIG. 6 may be more efficient than the option illustrated and described with respect to FIG. 5 for the cases when more than one TCI codepoints are indicated by MAC-CE. However, the option of FIG. 6 may result in more frequent changes to DCI formats 0_1/0_2 (e.g., scheduling DCI 620) as the beam indication DCI formats 1_1 1_2 (e.g., beam indication DCIs 615) may trigger the changes. The additional fields that may or may not be included in the scheduling DCIs include a second SRI field, a second TPMI field, a second PTRS-DMRS association field, a second TPC command field, or a combination thereof.

Further, as described with respect to FIG. 6, the additional fields in the scheduling DCI 620 may also be dependent on whether the UE is configured with two SRS resource sets with usage set to codebook or non-codebook (e.g., via RRC configuration). That is, if the UE is not configured with two SRS resource sets, then the scheduling DCI 620 may not include the additional fields. The scheduling DCI 620 may schedule repetitions of a PUSCH using configurations described with respect to SRS resource set indicator codepoints 00 and 01 described in FIG. 3. Further, if two TCI states (e.g., uplink or joint) are indicated to be applied starting from the given time, and only one SRS resource set is configured for a given DCI format (for DCI format 0_1 or 0_2), PUSCHs scheduled by that DCI format may use the first TCI state (e.g., the first one included in the mapping 630) or the TCI state with lower identifier among the two indicated TCI states. Additionally, the beam of SRS resources of the one SRS resource set may be updated to the first TCI state or the TCI state with lower ID among the two indicated TCI states.

The time to assume a change to DCI size for the scheduling DCI 620 responsive to a beam indication DCI 615 may be Y symbols after a HARQ-ACK 610 message that is transmitted in response to the beam indication DCI 615. Y may be RRC configured based on UE capability. Thus, the scheduling DCI 620-*a* is received at least Y symbols after the HARQ-ACK message 610-*a* that is responsive to the DCI 615-*a* and includes the additional fields. The scheduling DCI 620-*b* is received Y symbols after the HARQ-ACK message 610-*b* that is responsive to the DCI 615-*b* and does not include the additional fields (as the DCI 615-*b* indicates one TCI state). As illustrated, the beam indications are applied until a new beam indication DCI or a new MAC-CE message is received.

Figure 7A:
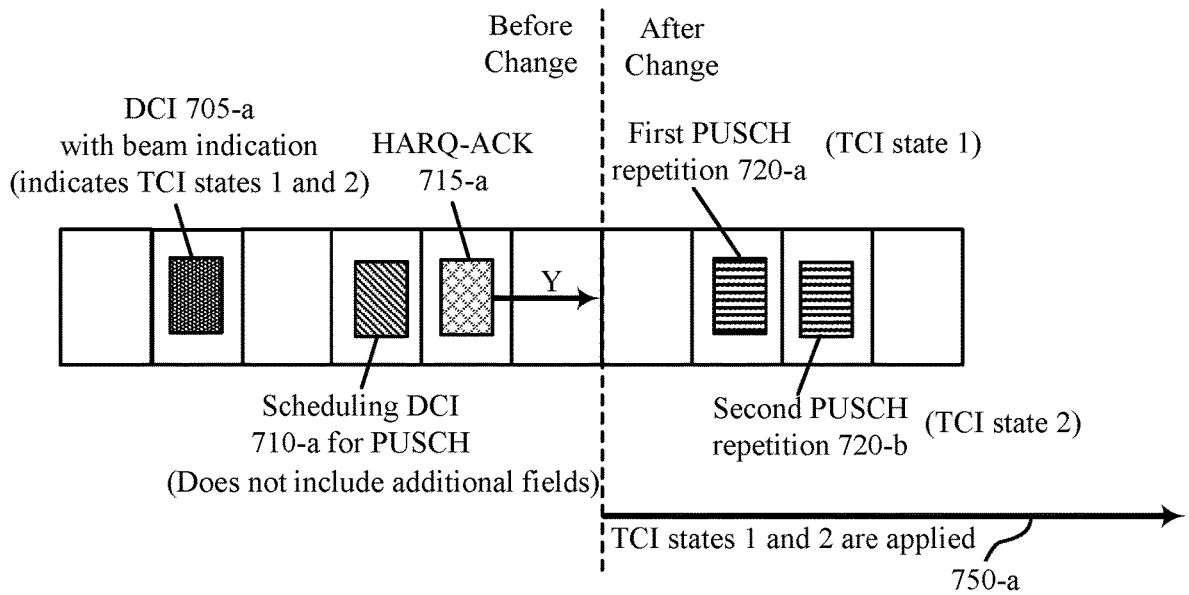
FIG. 7A and FIG. 7B illustrate examples of a TCI state indications that support DCI size adjustment in accordance with examples as disclosed herein.
Figure 7B:
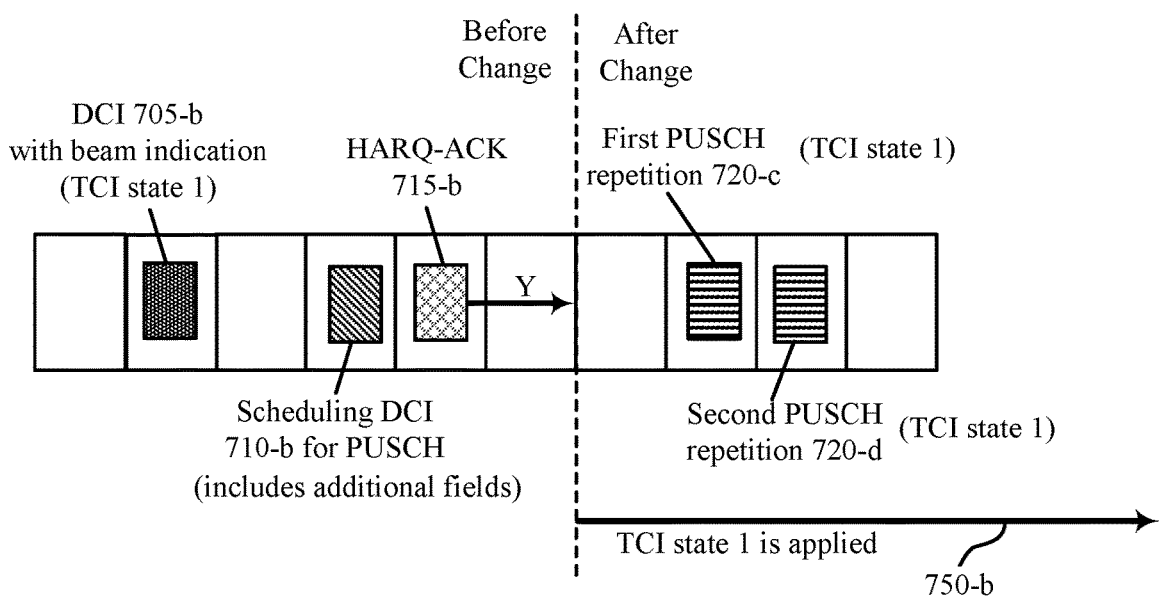

FIGS. 7A and 7B illustrate examples of TCI state indications 700-*a* and 700-*b* that support DCI size adjustment. The TCI state indications 700-*a* and 700-*b* may be implemented by one or more aspects of the wireless communications systems 100 or 200. For example, the TCI state indications 700-*a* and 700-*b* may be utilized by one or more TRPs (e.g., base stations or TRPs associated with a base station), and a UE, which may be examples of corresponding devices as described with reference to FIGS. 1 and 2.

In some examples, as illustrated in FIGS. 7A and 7B, the change in DCI size for DCI formats 0_1 and 0_2 starting from a given time (e.g., from having the additional fields to not having the additional fields, or from not having the additional fields to having the additional fields) based on a new MAC-CE or beam indication DCI may occur after the scheduling DCI is received. In such cases, the UE may be configured to apply or not apply one or two TCI states, depending on the implementation. Because a new MAC-CE may not imply that two beam to one beam or one beam to two beam behavior occurs (e.g., the MAC-CE changes the mapping of TCI codepoints to TCI states, but does not actually indicate a beam change), these cases may be more frequent for option 2, described with respect to FIG. 6, where the beam indication DCI triggers the change in the size of the scheduling DCI. However, in cases where a MAC-CE includes a single TCI codepoint, and as such, a beam indication DCI may not be used to indicate a beam, the behavior described with respect to FIG. 7A and FIG. 7B may be applicable.

As noted, the UE behavior described with respect to FIGS. 7A and 7B may be applicable when the beam indication DCI results in a change in the size of DCI formats 0_1 and 0_2 (scheduling DCI) via indication of two TCI states or one TCI state where the one or two TCI states are applicable to a PUSCH after the change but the scheduling DCI is received before the change. The UE behavior in these scenarios is described in further detail with respect to FIGS. 7A and 7B.

In FIG. 7A, a beam indication DCI 705-*a* (with or without PDSCH scheduling) indicates TCI states 1 and 2 (e.g., uplink or joint states). In such cases, as described herein, a scheduling DCI may include the additional fields if the scheduling DCI is received after the change is applicable (e.g., after Y symbols after a HARQ-ACK message 715-*a*). However, in FIG. 7A, a scheduling DCI 710-*a* is received before the change is applicable and the PUSCH repetitions 720-*a* and 720-*b* are scheduled after the change is applicable. In such cases, according to one option, the UE may transmit the scheduled PUSCH by applying the first TCI state (in the mapping via the MAC-CE message) or the TCI state with the lower identifier among the two indicated TCI states that are applied after the change, as indicated by period 750-*a*. In such cases, the UE may also assume that the PUSCH repetitions 720-*a* and 720-*b* (in the case of multiple repetitions being scheduled) are associated with a first SRS resource set configured (e.g., via RRC) for the DCI format. Thus, as illustrated, the PUSCH repetitions 720-*a* and 720-*b* may be transmitted using TCI state 1 and by applying the first SRS set that is configured.

According to another option for FIG. 7A, the UE may assume a fixed value for the additional fields for the scheduling DCI 710-*a* (that are not present before the change). The fixed values may be zeros or some other set of fixed values. Note that if the UE uses zeros as fixed values, then the UE behavior may be the same as described for the first option because an SRS resource set indicator field of "00" indicates that the UE is to use the first SRS resource set for the repetitions 720-*a* and 720-*b*. Thus, a fixed value for the SRS resource set indicator field may be assumed as a value other than zeros (e.g., "10" or "11"), which means that the PUSCH repetitions 720-*a* and 720-*b* with two beams (two TCI states applied after the change) may be scheduled even when the scheduling DCI 710-*a* is received before the change. For the other additional fields, zeros (or another value) may be used.

In FIG. 7B, a beam indication DCI 705-*b* (with or without PDSCH scheduling) indicates TCI state 1. In such cases, as described herein, a scheduling DCI may not include the additional fields if the scheduling DCI is received after the change is applicable (e.g., after Y symbols after a HARQ-ACK message 715-*b*). However, in FIG. 7B, a scheduling DCI 710-*b* is received before the change is applicable and scheduled PUSCH repetitions 720-*c* and 720-*d* are scheduled after the change is applicable. Thus, the scheduling DCI 710-*b* may include the additional fields, as the scheduling DCI 710-*b* is received before the change is applicable. In such cases, according to a first option, the UE may ignore the values for the additional fields.

According to a second option for the scenario depicted in FIG. 7B, the UE may apply a fixed value (e.g., zeros) for the additional fields. The result of the first option and the second option may be the same for the scheduled PUSCH repetitions 720-*c* and 720-*d*. That is, the PUSCH repetitions may use the same beam corresponding to the one indicated TCI state (TCI state 1) for period 750-*b*. Further, the UE may assume that the PUSCH repetitions 720-*c* and 720-*d* (in the case of multiple repetitions being scheduled) are associated with the first SRS resource set configured for the DCI format (if two SRS resource sets are configured).

In some examples, the techniques described herein may be applicable to DCI formats 1_1 and 1_2 that may be used to schedule PDSCH and PUCCH (for HARQ-ACK of the PDSCH). In mTRP schemes, the additional fields for DCI formats 1_1 and 1_2 may be a second TPC field for PUCCH (when the PRI in the DCI indicates a PUCCH resource with two beams or two sets of power control parameters). Thus, the resource overhead is not as high as the resources used for DCI formats 0_1 and 0_2, but additional fields may be included in DCI in some cases that may or may not be used when one TCI state is active or indicated. It should be noted that the DCI formats 1_1 and 1_2 (with or without scheduling PDSCH) may result in the DCI size change for a subsequent DCI format 1_1 or 1_2 (via the beam indication or TCI state indication). More particularly, the DCI format 1_1 or 1_2 for scheduling may be the target of the DCI change may not be the same DCI that indicates the beam that causes the DCI change.

Thus, according to these techniques, a UE may receive a MAC-CE message that maps two TCI states to one TCI codepoint. According to the techniques described with respect to FIG. 5, a subsequent DCI that schedules a PDSCH may include the additional fields based on the MAC-CE message activating the two TCI states and a prior beam indication DCI indicates two TCI states, provided the subsequent DCI is received during a period in which the MAC-CE is applied and the two TCI states are active. According to the techniques described with respect to FIG. 6, the UE may receive, after receiving the MAC-CE message, a beam indication DCI that indicates two TCI states. The UE may receive a second DCI, during a period in which the two TCI states are active, that schedules a PDSCH (and PUCCH). The second DCI may include the additional fields based on the two TCI states being active. The scheduling DCI may not include the additional fields after the MAC-CE maps one TCI state to the TCI codepoints or after beam indication DCI indicates one TCI state, depending on which procedure is followed. Additionally, the techniques described with respect to FIG. 7A and FIG. 7B may be applicable when the additional fields for a DCI 1_1 or 1_2 scheduling a PDSCH (and PUCCH) are included then not included or not included then included.

Figure 8:
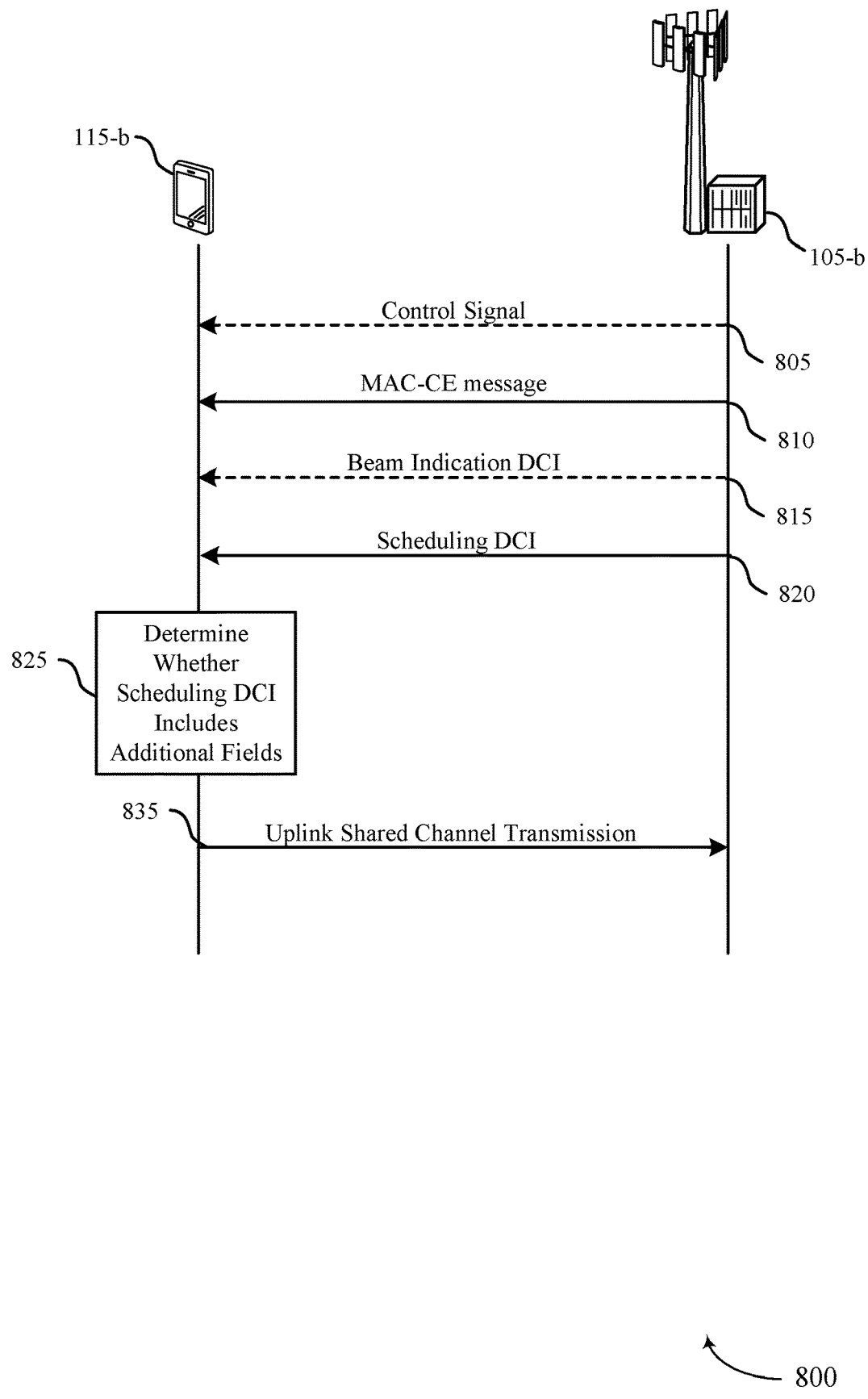
FIG. 8 illustrates an example of a process flow that supports downlink control information size adjustment based on unified TCI in accordance with examples as disclosed herein.

FIG. 8 illustrates an example of a process flow 800 that supports DCI size adjustment based on unified TCI state in accordance with examples as disclosed herein. The process flow 800 may be implemented by devices in a wireless communications system as discussed herein. For example, the process flow 800 may include a UE 115-*b* and a base station 105-*b*, which may be examples of UEs 115 and base stations 105 as discussed with reference to FIGS. 1 and 2. In the following description of the process flow 800, operations between the UE 115-*b* and the base station 105-*b*, may occur in a different order or at different times than as shown. Some operations also may be omitted from the process flow 800, and other operations may be added to the process flow 800, such as multiple TRPs in addition to the base station 105-*b*.

At 805, the base station 105-*b* may transmit a control signal to the UE 115-*b*. For example, the base station 105-*b* may transmit an RRC message to the UE 115-*b* indicating a set of available beam configurations TCI states, or multiple lists of beam configurations. In some implementations, beam configurations may refer to TCI states. Beam configurations may refer to one or more configurations or settings for transmitting uplink signaling, receiving downlink signaling, or both, such as TCI states. At 810, the base station 105-*b* may transmit a MAC-CE message (control message) to the UE 115-*b* that includes a mapping of TCI codepoints to TCI states. The MAC-CE message may indicate which TCI states, as indicated by the control signal (e.g., RRC message) at 805, are activated. In some implementations, the MAC-CE message may indicate joint TCI states, single TCI states, or both.

At 815, the base station 105-*b* may transmit a DCI message to the UE 115-*b*. The DCI message may be an example of a beam indication DCI that includes an indication of a TCI state via a TCI codepoint.

At 820, the base station 105-*b* may transmit a scheduling DCI to the UE 115-*b*. The scheduling DCI may schedule an uplink shared channel transmission (e.g., a PUSCH). The scheduling DCI may include a first set of fields specifying configuration information for a first set of repetitions of the uplink shared channel transmission.

At 825, the UE 115-*b* may determine whether the scheduling DCI includes an additional second set of fields specifying configuration information for a second set of repetitions of the uplink shared channel transmission. The determining may be based on the MAC-CE messaging mapping at least one TCI codepoint to two TCI states. The determining may be further based on the beam indication DCI including an indication of two TCI states via the TCI codepoint indication. Additionally, the determining may be based on whether the UE 115-*b* is configured with two SRS resources sets. The determining may be further based on when the scheduling DCI is received relative to the MAC-CE message, the beam indication DCI, or both. The additional fields may be a second SRI field, a second TPMI field, a second PTRS-DMRS association field, a second TPC command field, or a combination thereof.

At 835, the UE 115-*b* may transmit the uplink shared channel transmission in accordance with the scheduling DCI. In some cases, the UE may apply one or both SRS resource sets that may be configured for the UE for a repetition of the uplink shared channel transmission. Additionally, the UE 115-*b* may use a first TCI state of the two TCI states for a first set of repetitions of the physical uplink shared channel transmission and a second TCI state of the two TCI states for a second set of repetitions of the physical uplink shared channel transmission.

Figure 9:
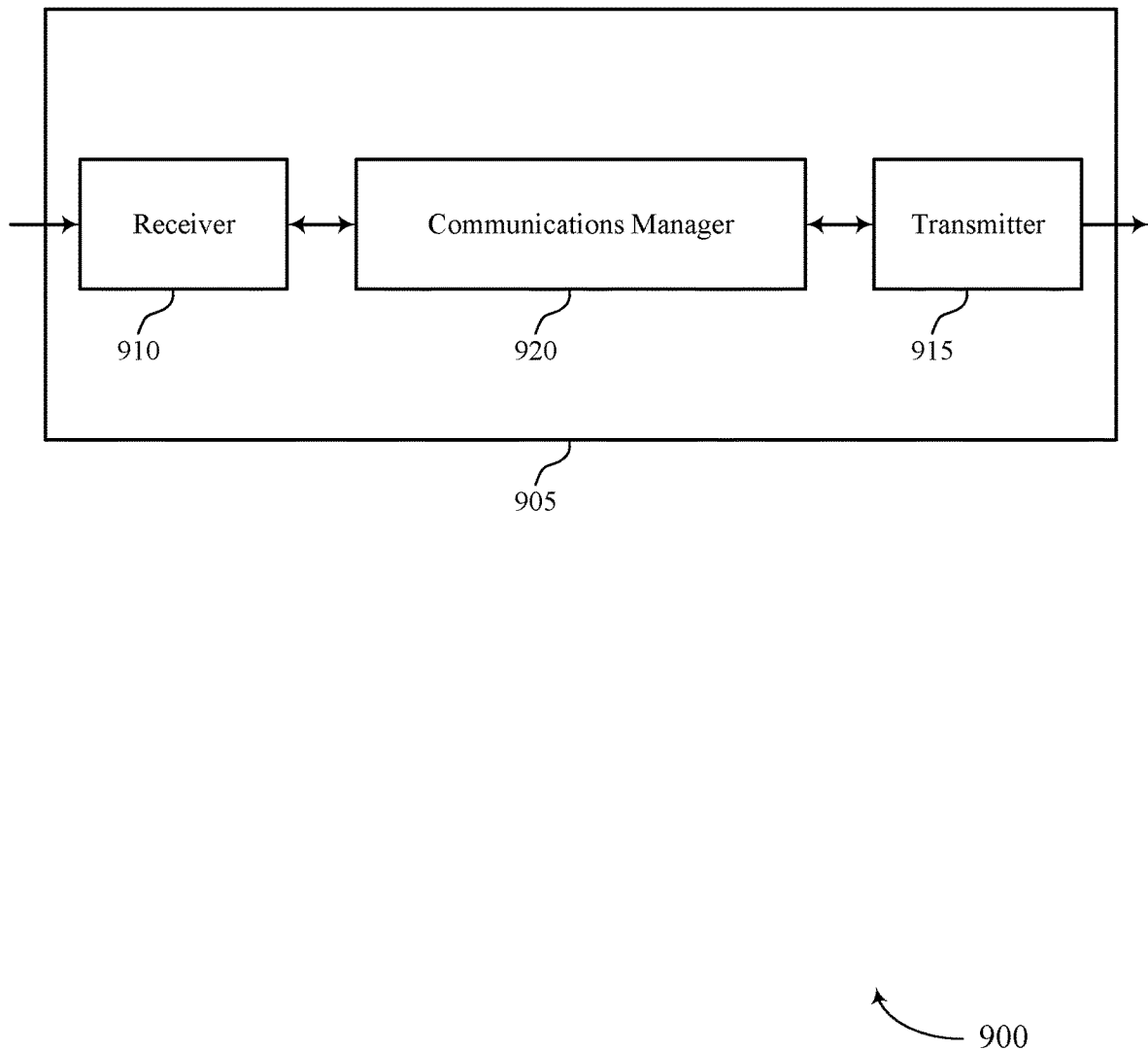
FIGS. 9 and 10 show block diagrams of devices that support downlink control information size adjustment based on unified TCI state in accordance with examples as disclosed herein.

FIG. 9 shows a block diagram 900 of a device 905 that supports DCI size adjustment based on unified TCI state in accordance with examples as disclosed herein. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to downlink control information size adjustment based on unified transmission configuration indicator state). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to downlink control information size adjustment based on unified transmission configuration indicator state). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of downlink control information size adjustment based on unified transmission configuration indicator state as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving a first control message including a mapping of at least one transmission configuration indicator codepoint to two transmission configuration indicator states. The communications manager 920 may be configured as or otherwise support a means for receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communications manager 920 may be configured as or otherwise support a means for transmitting the uplink shared channel transmission in accordance with the downlink control information message.

Figure 10:
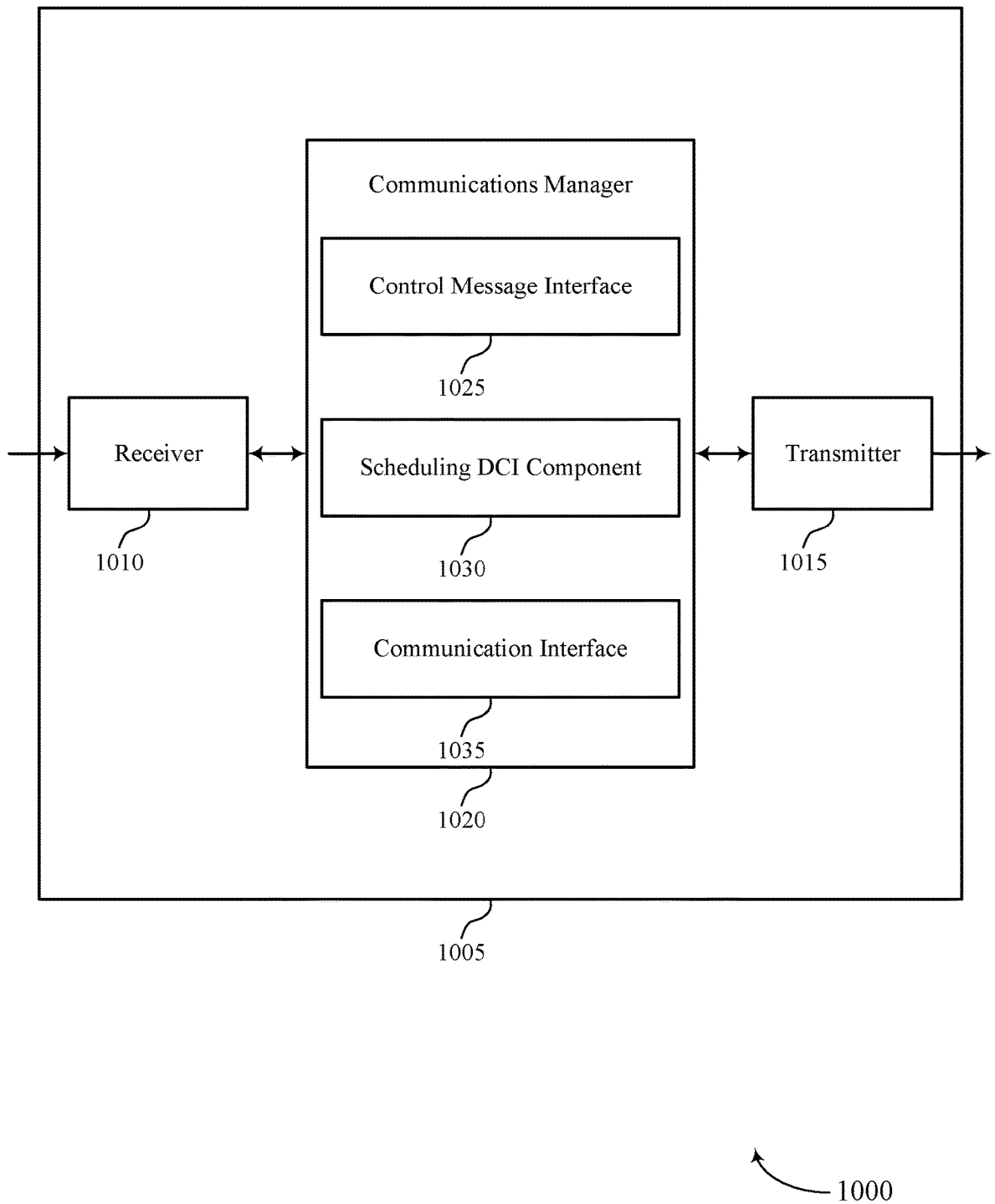

By including or configuring the communications manager 920 in accordance with examples as described herein, the device 905 (e.g., a processor controlling or otherwise coupled with the receiver 910, the transmitter 915, the communications manager 920, or a combination thereof) may support techniques for adjusting DCI size based on the use of unified TCI, which may provide for reduced signaling overhead, increased flexibility, more efficient use of spatial resources, decreased collisions and interference, increased reliability of communications, and improved user experience FIG. 10 shows a block diagram 1000 of a device 1005 that supports DCI size adjustment based on unified TCI state in accordance with examples as disclosed herein. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to downlink control information size adjustment based on unified transmission configuration indicator state). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to downlink control information size adjustment based on unified transmission configuration indicator state). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of downlink control information size adjustment based on unified transmission configuration indicator state as described herein. For example, the communications manager 1020 may include a control message interface 1025, a scheduling DCI component 1030, a communication interface 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The control message interface 1025 may be configured as or otherwise support a means for receiving a first control message including a mapping of at least one transmission configuration indicator codepoint to two transmission configuration indicator states. The scheduling DCI component 1030 may be configured as or otherwise support a means for receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communication interface 1035 may be configured as or otherwise support a means for transmitting the uplink shared channel transmission in accordance with the downlink control information message.

Figure 11:
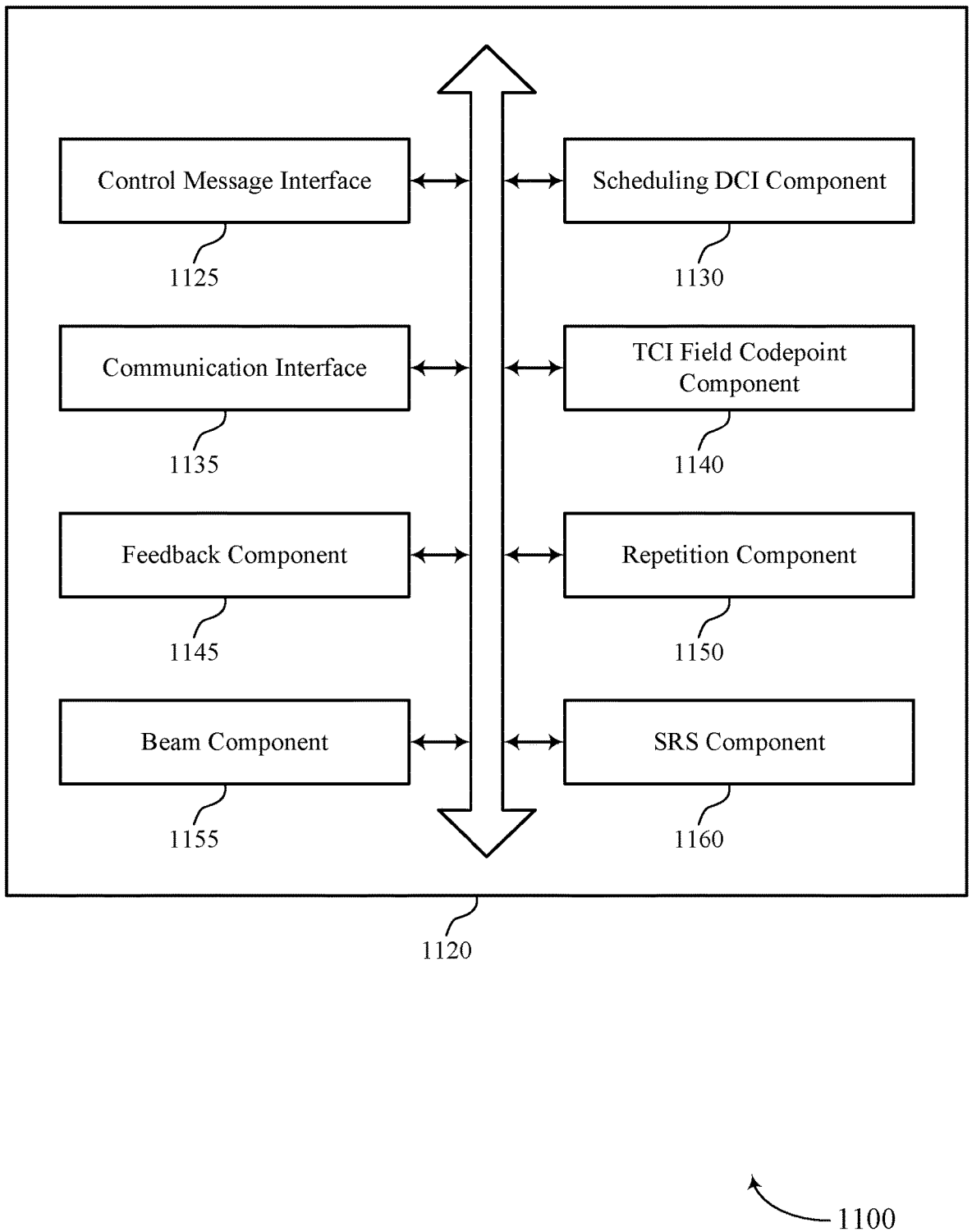
FIG. 11 shows a block diagram of a communications manager that supports DCI size adjustment based on unified TCI state in accordance with examples as disclosed herein.

FIG. 11 shows a block diagram 1100 of a communications manager 1120 that supports DCI size adjustment based on unified TCI state in accordance with examples as disclosed herein. The communications manager 1120 may be an example of aspects of a communications manager 920, a communications manager 1020, or both, as described herein. The communications manager 1120, or various components thereof, may be an example of means for performing various aspects of downlink control information size adjustment based on unified transmission configuration indicator state as described herein. For example, the communications manager 1120 may include a control message interface 1125, a scheduling DCI component 1130, a communication interface 1135, a TCI field codepoint component 1140, a feedback component 1145, a repetition component 1150, a beam component 1155, an SRS component 1160, or any combination thereof. Each of these components may communicate, directly or indirectly, with one another (e.g., via one or more buses).

The communications manager 1120 may support wireless communications at a UE in accordance with examples as disclosed herein. The control message interface 1125 may be configured as or otherwise support a means for receiving a first control message including a mapping of at least one transmission configuration indicator codepoint to two transmission configuration indicator states. The scheduling DCI component 1130 may be configured as or otherwise support a means for receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communication interface 1135 may be configured as or otherwise support a means for transmitting the uplink shared channel transmission in accordance with the downlink control information message.

In some examples, the TCI field codepoint component 1140 may be configured as or otherwise support a means for receiving, after receiving the first control message, a first downlink control information message that indicates that the two transmission configuration indicator states are active, where the second downlink control information message includes the additional second set of fields based on the first downlink control information message indicating that the two transmission configuration indicator states are active.

In some examples, to support transmitting the uplink shared channel transmission, the communication interface 1135 may be configured as or otherwise support a means for transmitting the uplink shared channel transmission using one transmission configuration indicator state of the two transmission configuration indicator states that is listed first in the mapping or that has a lower transmission configuration indicator state identifier, where the one transmission configuration indicator state is used based on the UE being configured with a single sounding reference signal resource set.

In some examples, the beam component 1155 may be configured as or otherwise support a means for applying, to the uplink shared channel transmission, a beam associated with the one transmission configuration indicator state for the single sounding reference signal resource set.

In some examples, the feedback component 1145 may be configured as or otherwise support a means for transmitting a feedback message that acknowledges the first downlink control information message, where the additional second set of fields are included in the second downlink control information message based on the first downlink control information message being received after a threshold number of symbols from transmission of the feedback message.

In some examples, the control message interface 1125 may be configured as or otherwise support a means for receiving a radio resource control message that includes an indication of the threshold number of symbols.

In some examples, the scheduling DCI component 1130 may be configured as or otherwise support a means for receiving a third downlink control information message during a time duration after receipt of the first downlink control information message and before a period during which the two transmission configuration indicator states are active, where the third downlink control information message schedules a second uplink shared channel transmission. In some examples, the scheduling DCI component 1130 may be configured as or otherwise support a means for determining that the third downlink control information message does not include the additional second set of fields based on the third downlink control information message being received during the time duration. In some examples, the communication interface 1135 may be configured as or otherwise support a means for transmitting the second uplink shared channel transmission in accordance with the third downlink control information message.

In some examples, to support transmitting the second uplink shared channel transmission, the communication interface 1135 may be configured as or otherwise support a means for transmitting the second uplink shared channel transmission using one transmission configuration indicator state of the two transmission configuration indicator states that is listed first in the mapping or that has a lower transmission configuration indicator state identifier, where the one transmission configuration indicator state is used based on the third downlink control information message being received during the time duration and not including the additional second set of fields.

In some examples, the SRS component 1160 may be configured as or otherwise support a means for applying, to a repetition of the second uplink shared channel transmission, a first sounding reference signal resource set of two sounding reference signal resource sets configured at the UE, where the first sounding reference signal resource set is applied based on the third downlink control information message being received during the time duration and not including the additional second set of fields.

In some examples, the scheduling DCI component 1130 may be configured as or otherwise support a means for applying, as values for the additional second set of fields that are not included in the third downlink control information message, a set of fixed values, where the second uplink shared channel transmission is transmitted in accordance with the third downlink control information message and the set of fixed values applied for the additional second set of fields.

In some examples, the TCI field codepoint component 1140 may be configured as or otherwise support a means for receiving, after receiving the first control message, a first downlink control information message that includes an indication of a transmission configuration indicator codepoint that is mapped to a single transmission configuration indicator state. In some examples, the scheduling DCI component 1130 may be configured as or otherwise support a means for determining that the second downlink control information message is received during a period in which the two transmission configuration indicator states are active. In some examples, the scheduling DCI component 1130 may be configured as or otherwise support a means for determining that the uplink shared channel transmission is scheduled during a period during which the single transmission configuration indicator state is active, where the uplink shared channel transmission is transmitted in accordance with the second downlink control information message.

In some examples, to support transmitting the uplink shared channel transmission, the communication interface 1135 may be configured as or otherwise support a means for transmitting, based on the uplink shared channel transmission being scheduled during a period which the single transmission configuration indicator state is active, the uplink shared channel transmission using the first set of fields specifying the configuration information for the first set of repetitions and without applying the additional second set of fields.

In some examples, to support transmitting the uplink shared channel transmission, the scheduling DCI component 1130 may be configured as or otherwise support a means for applying, as values for the additional second set of fields that are included in the second downlink control information message and based on the uplink shared channel transmission being scheduled during the period which the single transmission configuration indicator state is active, a set of fixed values, where the uplink shared channel transmission is transmitted in accordance with the second downlink control information message and the set of fixed values applied for the additional second set of fields.

In some examples, the SRS component 1160 may be configured as or otherwise support a means for applying, to a repetition of the uplink shared channel transmission, a first sounding reference signal resource set of two sounding reference signal resource sets configured at the UE, where the first sounding reference signal resource set is applied based on the second downlink control information message being received during the period and not including the additional second set of fields.

In some examples, the control message interface 1125 may be configured as or otherwise support a means for receiving a radio resource control message that configures a first sounding reference signal resource set to be applied to the first set of repetitions and a second sounding reference signal resource set to be applied to the second set of repetitions, where the downlink control information message includes the additional second set of fields based on the radio resource control message configuring the first sounding reference signal resource set and the second sounding reference signal resource set.

In some examples, the additional second set of fields include a sounding reference signal resource set indicator field, a second sounding reference signal resource indicator field, a second transmitted precoding matrix index (TPMI) field, a second phase tracking reference signal (PTRS) DMRS association field, a second transmit power control (TPC) command field, or a combination thereof.

In some examples, the feedback component 1145 may be configured as or otherwise support a means for transmitting a feedback message that acknowledges the first control message, where the additional second set of fields are included in the downlink control information message based on the downlink control information message being received after a threshold time from transmission of the feedback message.

In some examples, the threshold time is 3 ms.

In some examples, the two transmission configuration indicator states are joint transmission configuration indicator states or both uplink transmission configuration indicator states.

In some examples, the repetition component 1150 may be configured as or otherwise support a means for applying a first transmission configuration indicator state of the two transmission configuration indicator states to the first set of repetitions. In some examples, the repetition component 1150 may be configured as or otherwise support a means for applying a second transmission configuration indicator state the two transmission configuration indicator states to the second set of repetitions, where the first set of repetitions and the second set of repetitions are transmitted in accordance with the downlink control information message.

Figure 12:
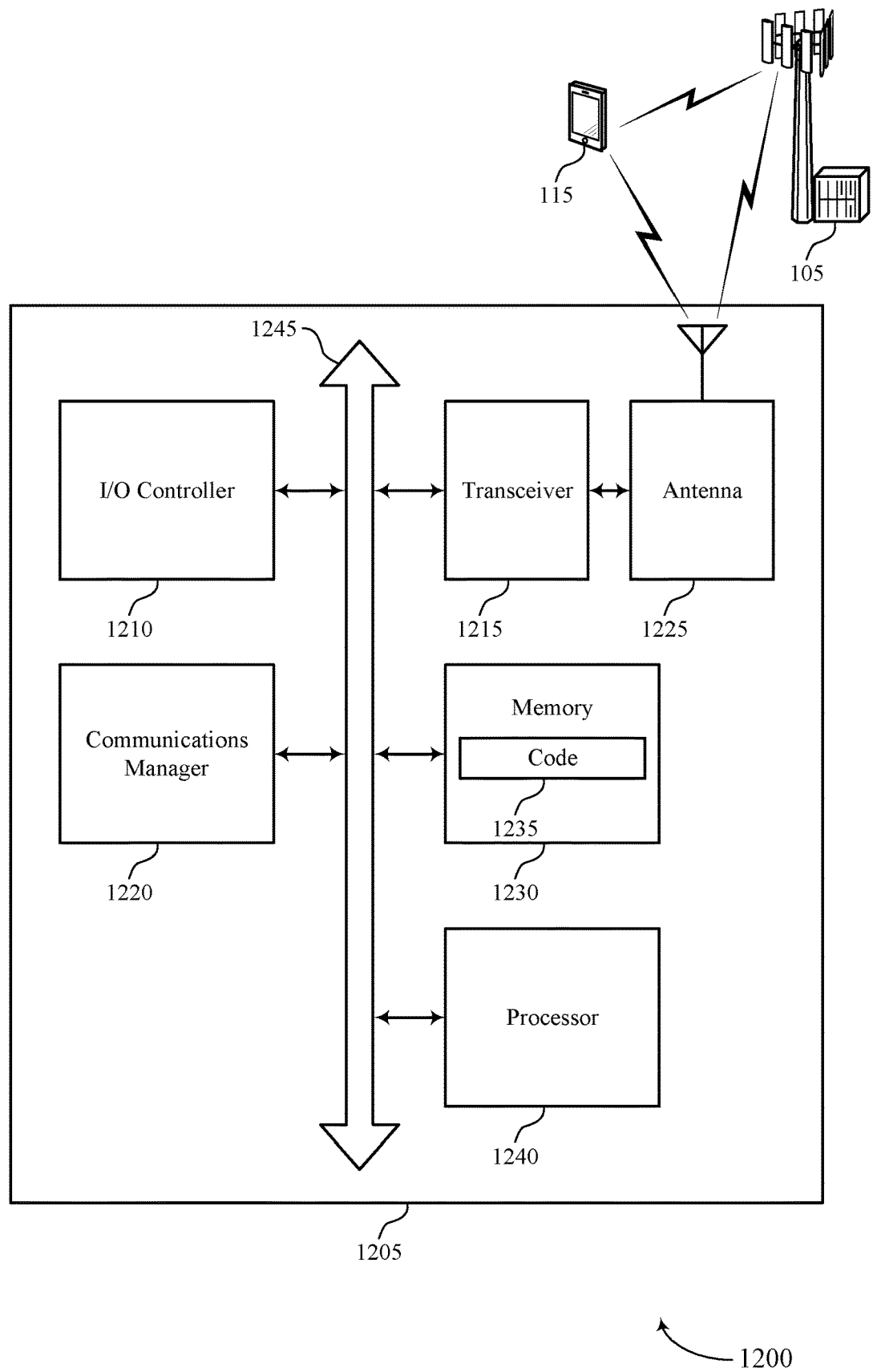
FIG. 12 shows a diagram of a system including a device that supports DCI size adjustment based on unified TCI in accordance with examples as disclosed herein.

FIG. 12 shows a diagram of a system 1200 including a device 1205 that supports DCI size adjustment based on unified TCI state in accordance with examples as disclosed herein. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting downlink control information size adjustment based on unified transmission configuration indicator state). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving a first control message including a mapping of at least one transmission configuration indicator codepoint to two transmission configuration indicator states. The communications manager 1220 may be configured as or otherwise support a means for receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communications manager 1220 may be configured as or otherwise support a means for transmitting the uplink shared channel transmission in accordance with the downlink control information message.

By including or configuring the communications manager 1220 in accordance with examples as described herein, the device 1205 may support techniques for adjusting DCI size based on the use of unified TCI, which may provide for reduced signaling overhead, increased flexibility, more efficient use of spatial resources, decreased collisions and interference, increased reliability of communications, and improved user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of downlink control information size adjustment based on unified transmission configuration indicator state as described herein, or the processor 1240 and the memory 1230 may be otherwise configured to perform or support such operations.

Figure 13:
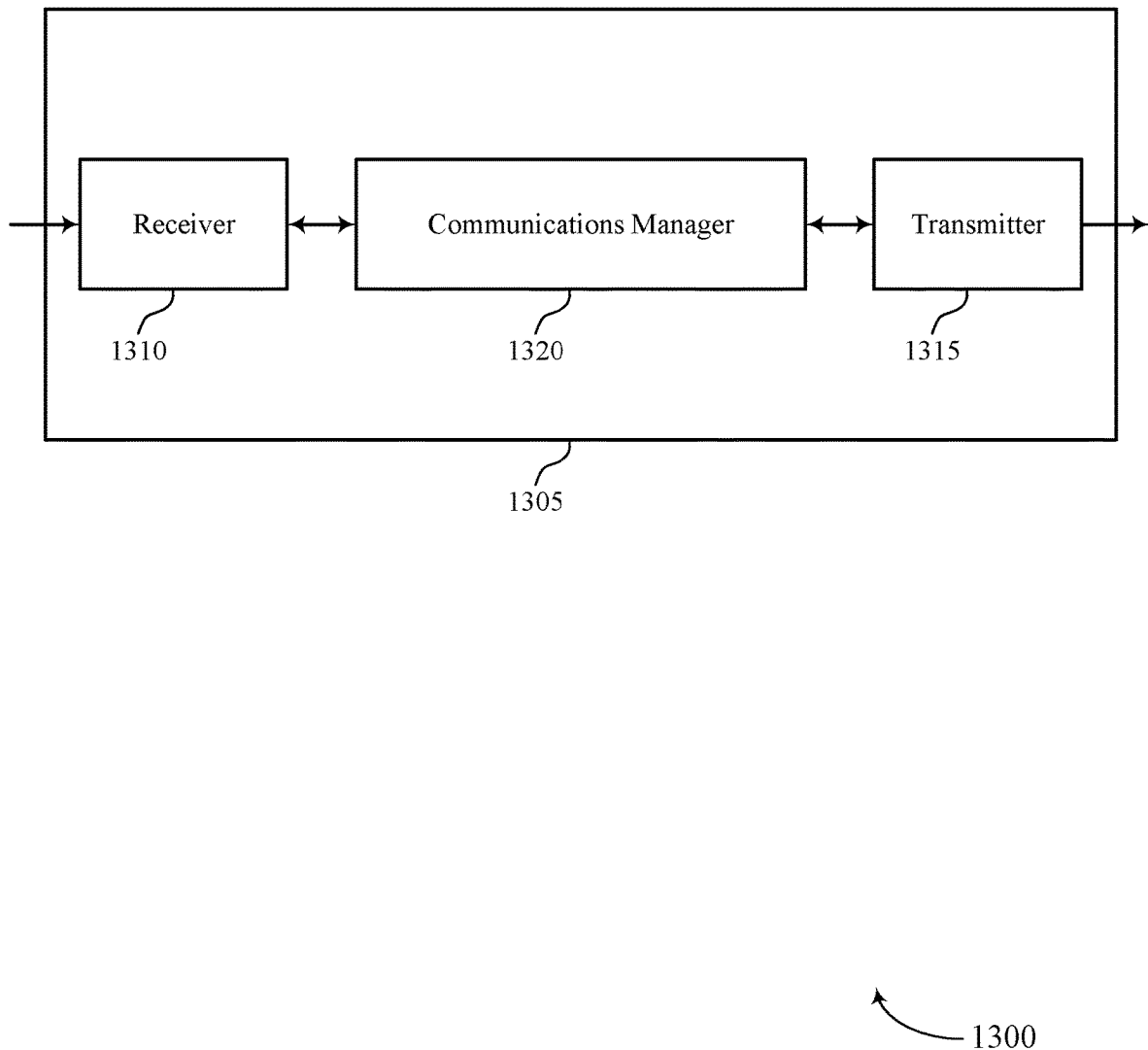
FIGS. 13 and 14 show block diagrams of devices that support DCI size adjustment based on unified TCI state in accordance with examples as disclosed herein.

FIG. 13 shows a block diagram 1300 of a device 1305 that supports DCI size adjustment based on unified TCI state in accordance with examples as disclosed herein. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to downlink control information size adjustment based on unified transmission configuration indicator state). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to downlink control information size adjustment based on unified transmission configuration indicator state). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of downlink control information size adjustment based on unified transmission configuration indicator state as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting, to a UE, a first control message including a mapping of at least one transmission configuration indicator codepoint to two transmission configuration indicator states. The communications manager 1320 may be configured as or otherwise support a means for transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communications manager 1320 may be configured as or otherwise support a means for receiving, from the UE, the uplink shared channel transmission in accordance with the downlink control information message.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for adjusting DCI size based on the use of unified TCI, which may provide for reduced signaling overhead, increased flexibility, more efficient use of spatial resources, decreased collisions and interference, increased reliability of communications, and improved user experience.

Figure 14:
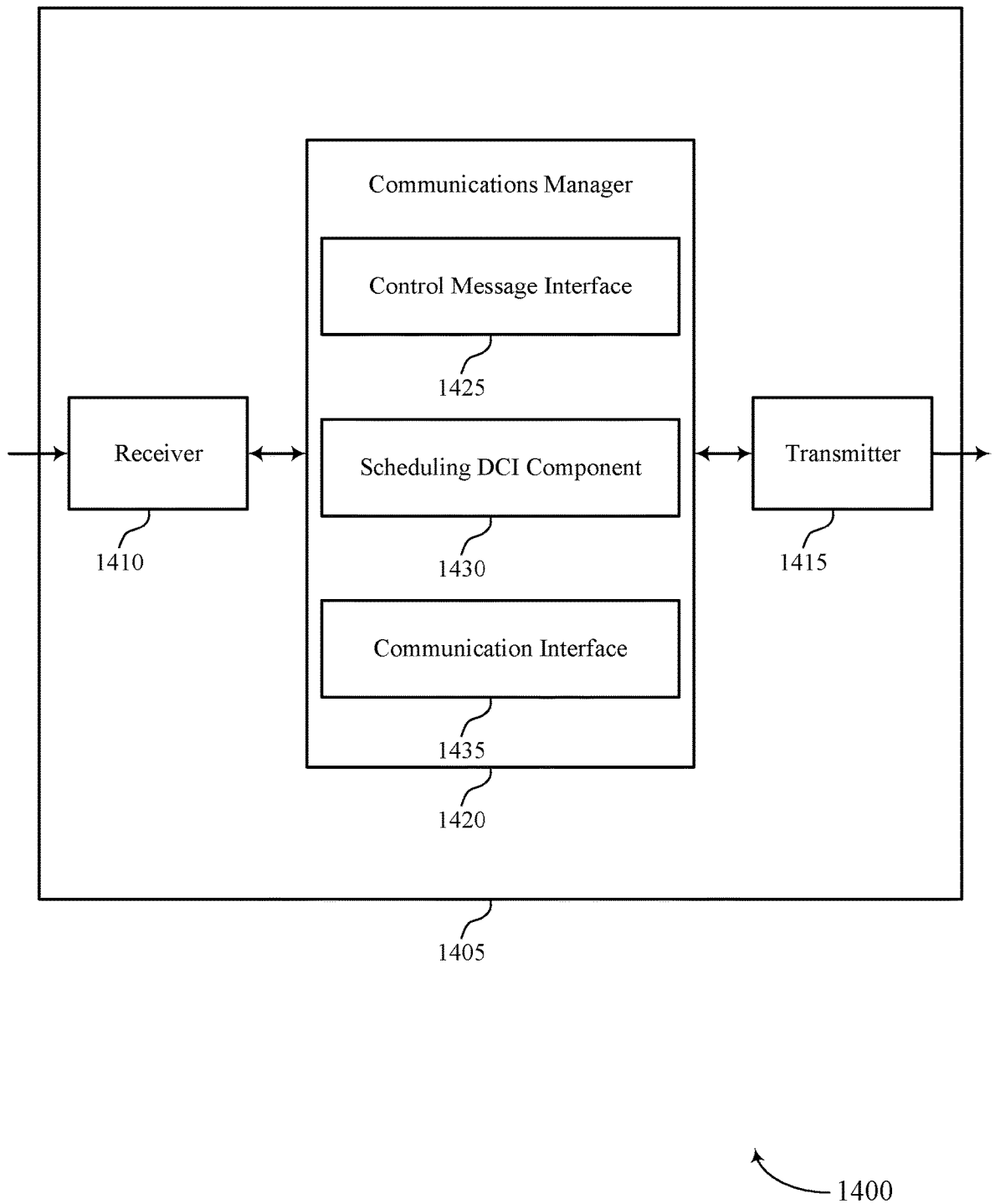

FIG. 14 shows a block diagram 1400 of a device 1405 that supports DCI size adjustment based on unified TCI state in accordance with examples as disclosed herein. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to downlink control information size adjustment based on unified transmission configuration indicator state). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to downlink control information size adjustment based on unified transmission configuration indicator state). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of downlink control information size adjustment based on unified transmission configuration indicator state as described herein. For example, the communications manager 1420 may include a control message interface 1425, a scheduling DCI component 1430, a communication interface 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The control message interface 1425 may be configured as or otherwise support a means for transmitting, to a UE, a first control message including a mapping of at least one transmission configuration indicator codepoint to two transmission configuration indicator states. The scheduling DCI component 1430 may be configured as or otherwise support a means for transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communication interface 1435 may be configured as or otherwise support a means for receiving, from the UE, the uplink shared channel transmission in accordance with the downlink control information message.

Figure 15:
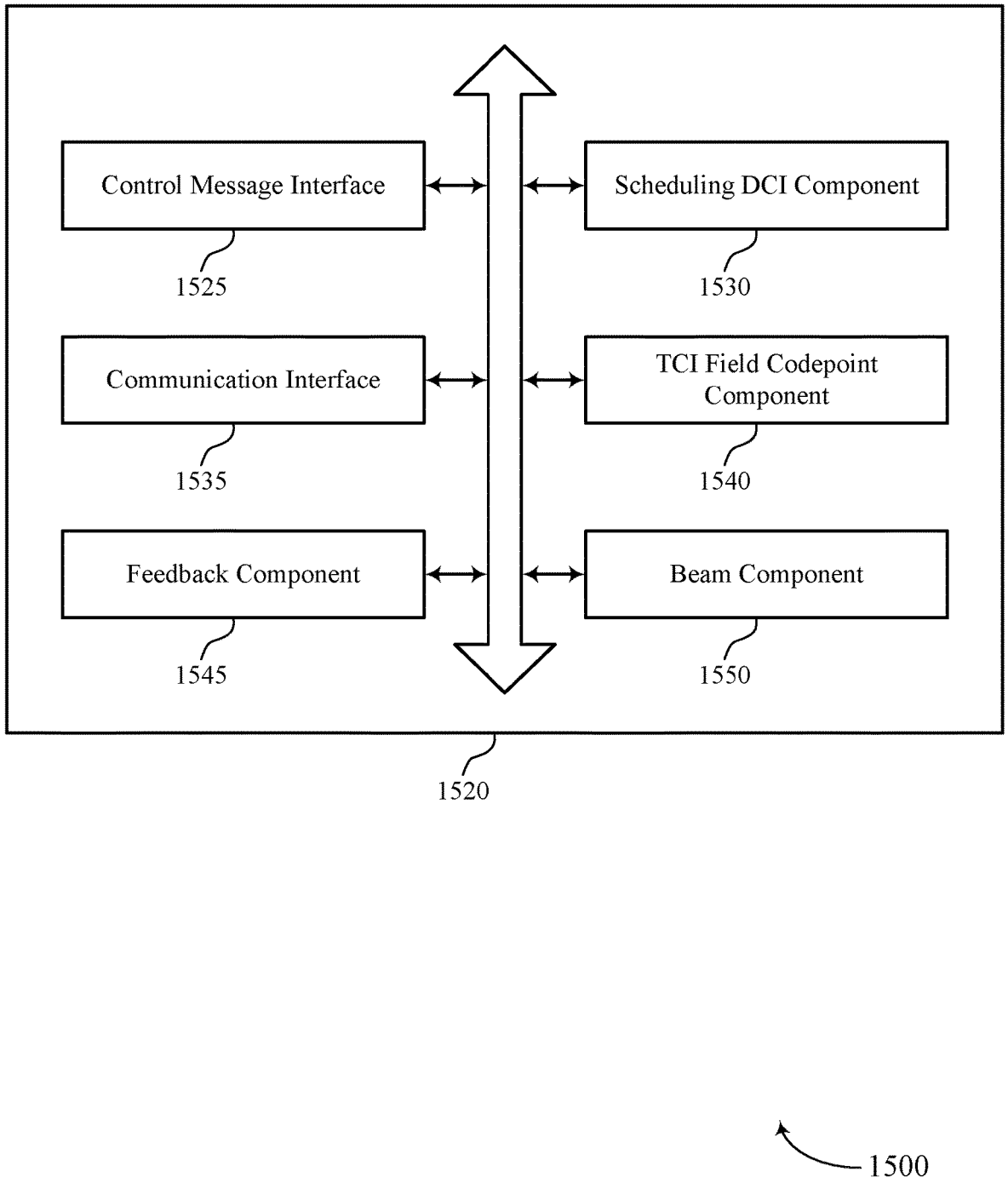
FIG. 15 shows a block diagram of a communications manager that supports DCI size adjustment based on unified transmission configuration indicator state in accordance with examples as disclosed herein.

FIG. 15 shows a block diagram 1500 of a communications manager 1520 that supports DCI size adjustment based on unified TCI state in accordance with examples as disclosed herein. The communications manager 1520 may be an example of aspects of a communications manager 1320, a communications manager 1420, or both, as described herein. The communications manager 1520, or various components thereof, may be an example of means for performing various aspects of downlink control information size adjustment based on unified transmission configuration indicator state as described herein. For example, the communications manager 1520 may include a control message interface 1525, a scheduling DCI component 1530, a communication interface 1535, a TCI field codepoint component 1540, a feedback component 1545, a beam component 1550, or any combination thereof. Each of these components may communicate, directly or indirectly, with one another (e.g., via one or more buses).

The communications manager 1520 may support wireless communication at a base station in accordance with examples as disclosed herein. The control message interface 1525 may be configured as or otherwise support a means for transmitting, to a UE, a first control message including a mapping of at least one transmission configuration indicator codepoint to two transmission configuration indicator states. The scheduling DCI component 1530 may be configured as or otherwise support a means for transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communication interface 1535 may be configured as or otherwise support a means for receiving, from the UE, the uplink shared channel transmission in accordance with the downlink control information message.

In some examples, the TCI field codepoint component 1540 may be configured as or otherwise support a means for transmitting, after transmitting the first control message, a first downlink control information message that indicates that two transmission configuration indicator states are active, where the second downlink control information message includes the additional second set of fields based on the first downlink control information message indicating that the two transmission configuration indicator states are active.

In some examples, to support receiving the uplink shared channel transmission, the communication interface 1535 may be configured as or otherwise support a means for receiving the uplink shared channel transmission in accordance with one transmission configuration indicator state of the two transmission configuration indicator states that is listed first in the mapping or that has a lower transmission configuration indicator state identifier, where the one transmission configuration indicator state is used based on the UE being configured with a single sounding reference signal resource set.

In some examples, the beam component 1550 may be configured as or otherwise support a means for determining that the UE is to apply, to the uplink shared channel transmission, a beam associated with the one transmission configuration indicator state for the single sounding reference signal resource set.

In some examples, the feedback component 1545 may be configured as or otherwise support a means for receiving, from the UE, a feedback message that acknowledges the first downlink control information message, where the additional second set of fields are included in the second downlink control information message based on the first downlink control information message being received after a threshold number of symbols from transmission of the feedback message.

In some examples, the control message interface 1525 may be configured as or otherwise support a means for transmitting, to the UE, a radio resource control message that configures a first sounding reference signal resource set to be applied to the first set of repetitions and a second sounding reference signal resource set to be applied to the second set of repetitions, where the downlink control information message includes the additional second set of fields based on the radio resource control message configuring the first sounding reference signal resource set and the second sounding reference signal resource set.

In some examples, the additional second set of fields include a sounding reference signal resource set indicator field, a second sounding reference signal resource indicator field, a second transmitted precoding matrix index (TPMI) field, a second phase tracking reference signal (PTRS) DMRS association field, a second transmit power control (TPC) command field, or a combination thereof.

In some examples, the two transmission configuration indicator states are joint transmission configuration indicator states or both uplink transmission configuration indicator states.

Figure 16:
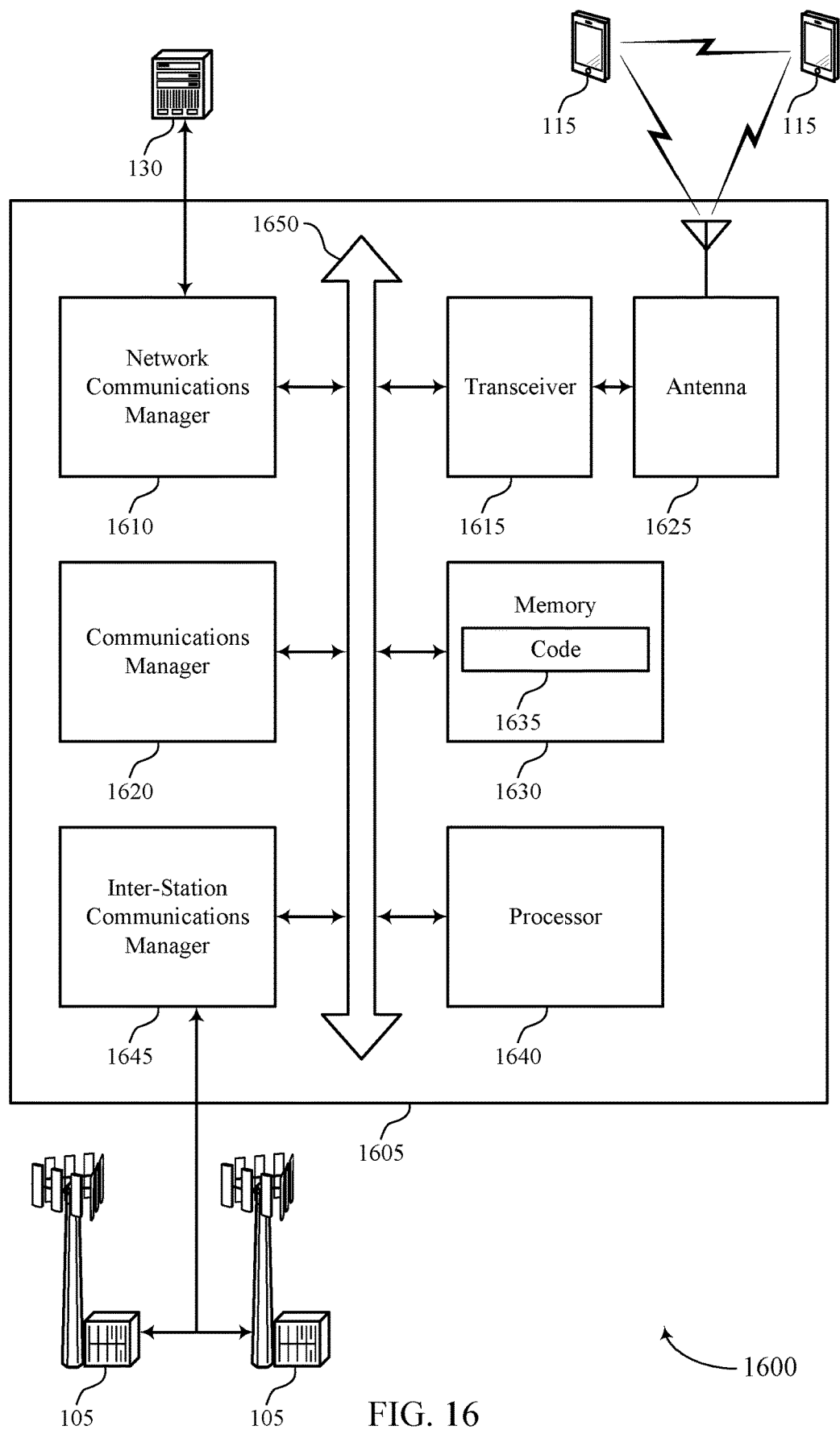
FIG. 16 shows a diagram of a system including a device that supports DCI size adjustment based on unified TCI state in accordance with examples as disclosed herein.

FIG. 16 shows a diagram of a system 1600 including a device 1605 that supports DCI size adjustment based on unified TCI state in accordance with examples as disclosed herein. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting downlink control information size adjustment based on unified transmission configuration indicator state). For example, the device 1605 or a component of the device 1605 may include a processor 1640 and memory 1630 coupled with or to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting, to a UE, a first control message including a mapping of at least one transmission configuration indicator codepoint to two transmission configuration indicator states. The communications manager 1620 may be configured as or otherwise support a means for transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The communications manager 1620 may be configured as or otherwise support a means for receiving, from the UE, the uplink shared channel transmission in accordance with the downlink control information message.

By including or configuring the communications manager 1620 in accordance with examples as described herein, the device 1605 may support techniques for adjusting DCI size based on the use of unified TCI, which may provide for reduced signaling overhead, increased flexibility, more efficient use of spatial resources, decreased collisions and interference, increased reliability of communications, and improved user experience.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of downlink control information size adjustment based on unified transmission configuration indicator state as described herein, or the processor 1640 and the memory 1630 may be otherwise configured to perform or support such operations.

Figure 17:
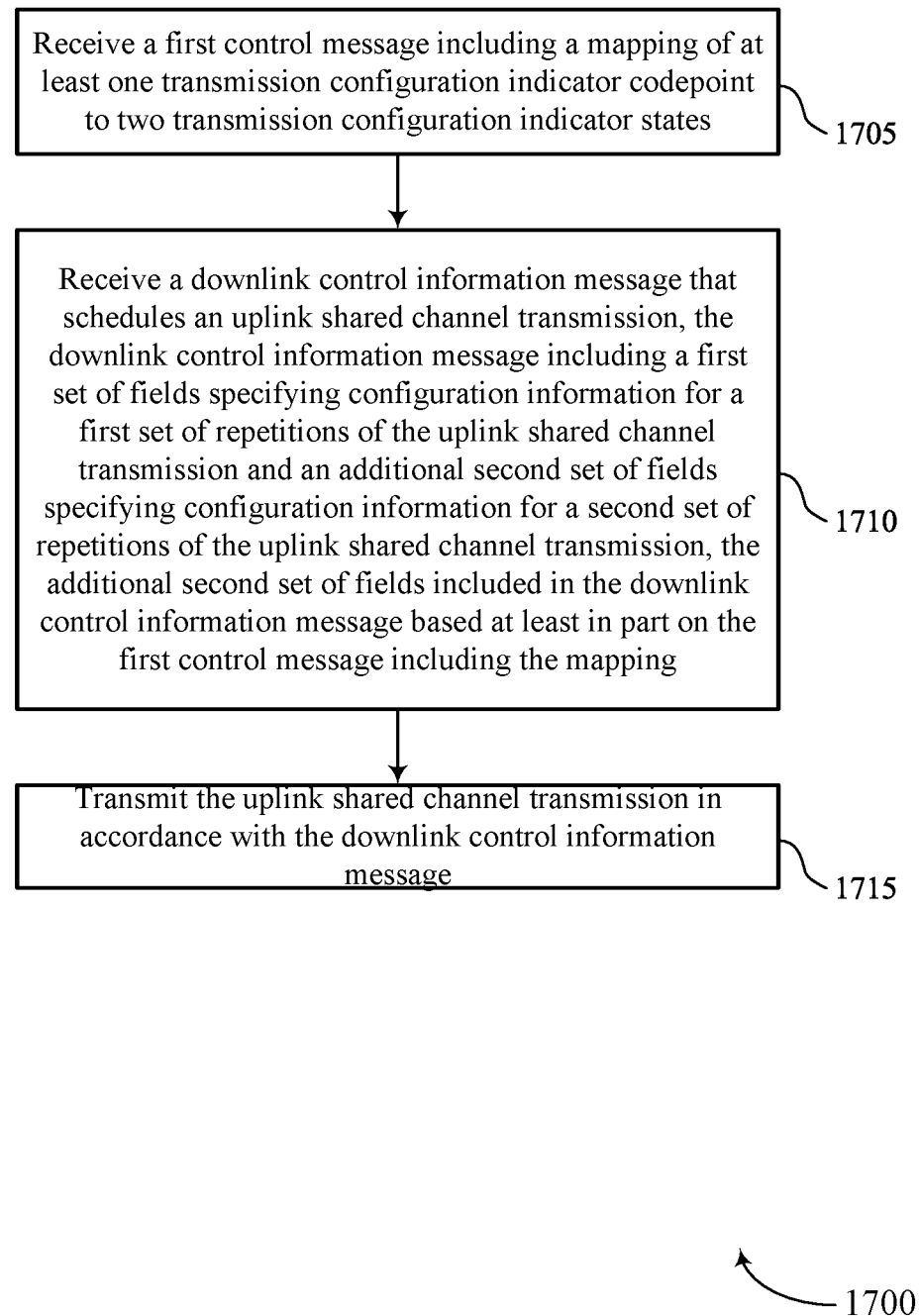
FIGS. 17 through 20 show flowcharts illustrating methods that support DCI size adjustment based on unified TCI state in accordance with examples as disclosed herein.

FIG. 17 shows a flowchart illustrating a method 1700 that supports DCI size adjustment based on unified TCI state in accordance with examples as disclosed herein. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving a first control message including a mapping of at least one transmission configuration indicator codepoint to two transmission configuration indicator states. The operations of 1705 may be performed in accordance with examples as disclosed herein. In some examples, aspects of the operations of 1705 may be performed by a control message interface 1125 as described with reference to FIG. 11.

At 1710, the method may include receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The operations of 1710 may be performed in accordance with examples as disclosed herein. In some examples, aspects of the operations of 1710 may be performed by a scheduling DCI component 1130 as described with reference to FIG. 11.

At 1715, the method may include transmitting the uplink shared channel transmission in accordance with the downlink control information message. The operations of 1715 may be performed in accordance with examples as disclosed herein. In some examples, aspects of the operations of 1715 may be performed by a communication interface 1135 as described with reference to FIG. 11.

Figure 18:
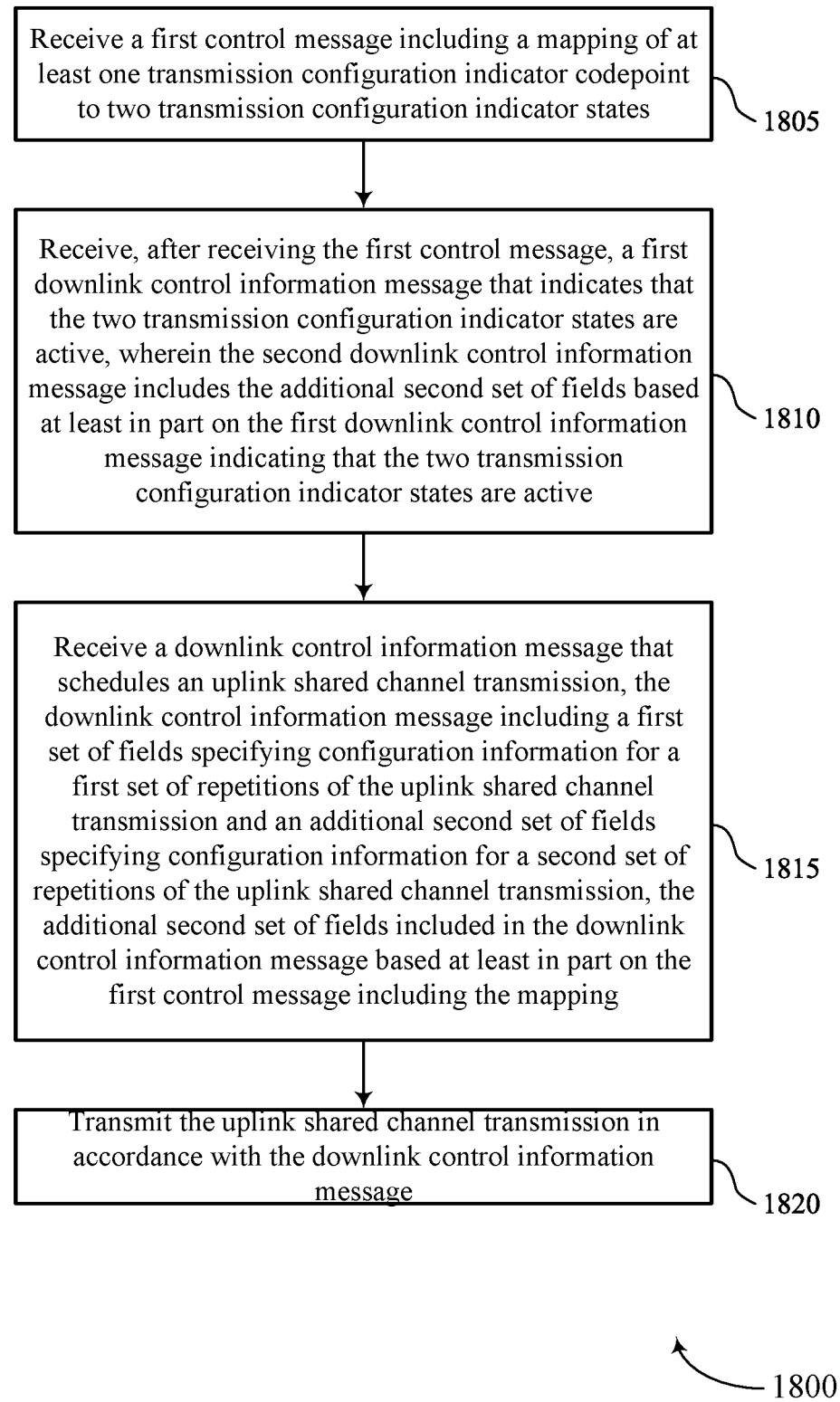

FIG. 18 shows a flowchart illustrating a method 1800 that supports DCI size adjustment based on unified TCI state in accordance with examples as disclosed herein. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving a first control message including a mapping of at least one transmission configuration indicator codepoint to two transmission configuration indicator states. The operations of 1805 may be performed in accordance with examples as disclosed herein. In some examples, aspects of the operations of 1805 may be performed by a control message interface 1125 as described with reference to FIG. 11.

At 1810, the method may include receiving, after receiving the first control message, a first downlink control information message that indicates that the two transmission configuration indicator states are active, where the second downlink control information message includes the additional second set of fields based on the first downlink control information message indicating that the two transmission configuration indicator states are active. The operations of 1810 may be performed in accordance with examples as disclosed herein. In some examples, aspects of the operations of 1810 may be performed by a TCI field codepoint component 1140 as described with reference to FIG. 11.

At 1815, the method may include receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The operations of 1815 may be performed in accordance with examples as disclosed herein. In some examples, aspects of the operations of 1815 may be performed by a scheduling DCI component 1130 as described with reference to FIG. 11.

At 1820, the method may include transmitting the uplink shared channel transmission in accordance with the downlink control information message. The operations of 1820 may be performed in accordance with examples as disclosed herein. In some examples, aspects of the operations of 1820 may be performed by a communication interface 1135 as described with reference to FIG. 11.

Figure 19:
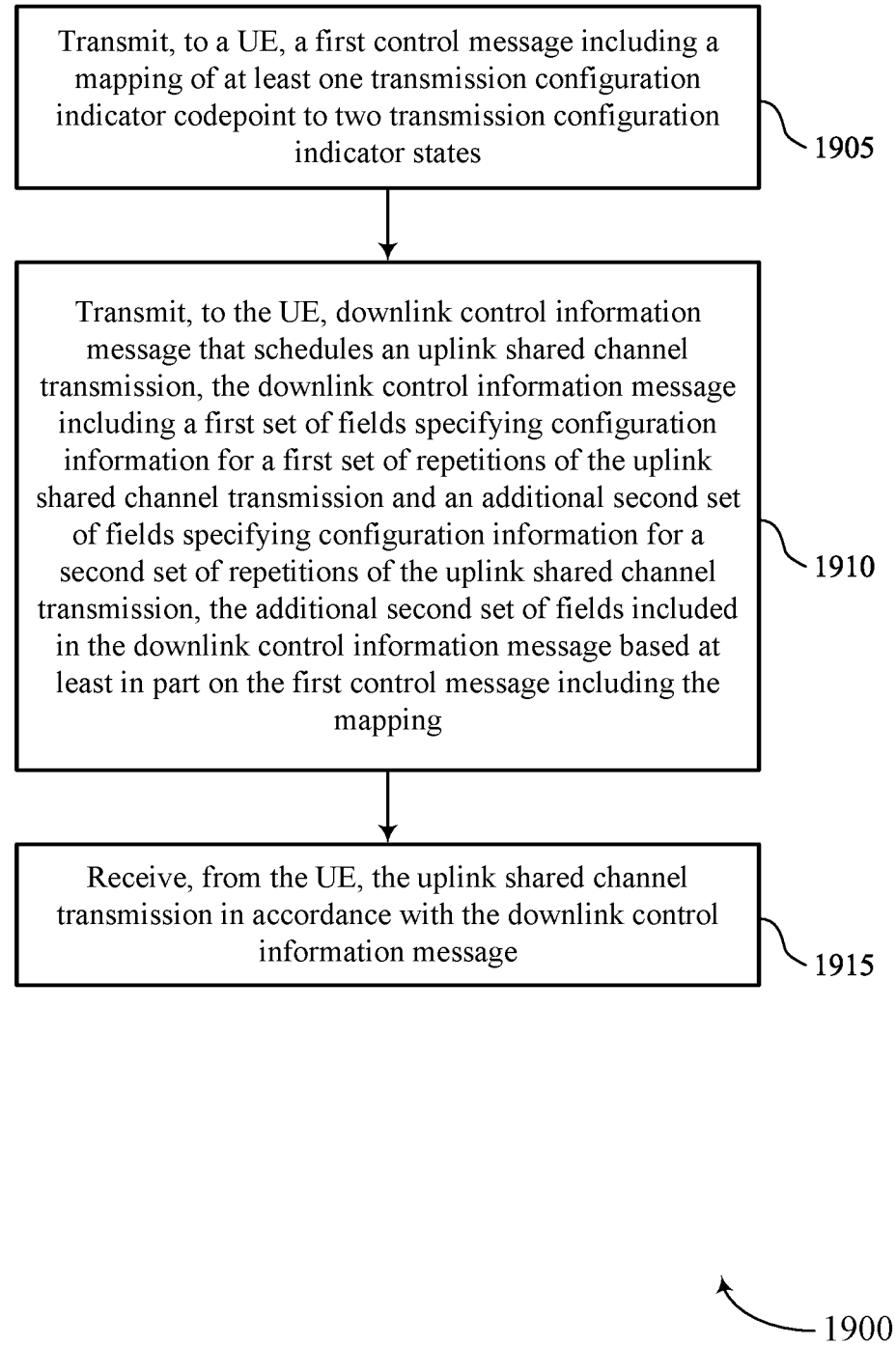

FIG. 19 shows a flowchart illustrating a method 1900 that supports DCI size adjustment based on unified TCI state in accordance with examples as disclosed herein. The operations of the method 1900 may be implemented by a base station or its components as described herein. For example, the operations of the method 1900 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a first control message including a mapping of at least one transmission configuration indicator codepoint to two transmission configuration indicator states. The operations of 1905 may be performed in accordance with examples as disclosed herein. In some examples, aspects of the operations of 1905 may be performed by a control message interface 1525 as described with reference to FIG. 15.

At 1910, the method may include transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The operations of 1910 may be performed in accordance with examples as disclosed herein. In some examples, aspects of the operations of 1910 may be performed by a scheduling DCI component 1530 as described with reference to FIG. 15.

At 1915, the method may include receiving, from the UE, the uplink shared channel transmission in accordance with the downlink control information message. The operations of 1915 may be performed in accordance with examples as disclosed herein. In some examples, aspects of the operations of 1915 may be performed by a communication interface 1535 as described with reference to FIG. 15.

Figure 20:
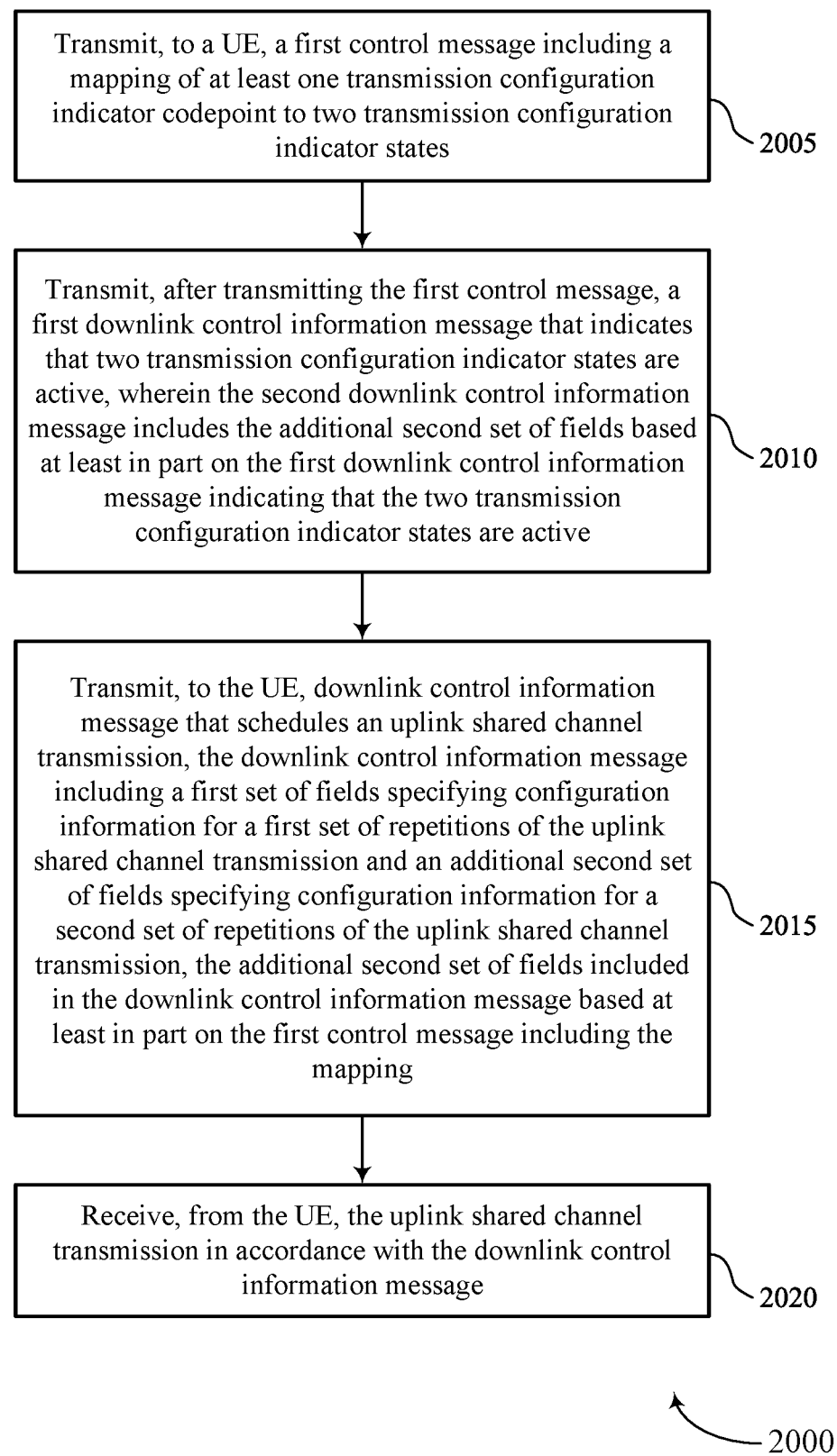

FIG. 20 shows a flowchart illustrating a method 2000 that supports DCI size adjustment based on unified TCI state in accordance with examples as disclosed herein. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a first control message including a mapping of at least one transmission configuration indicator codepoint to two transmission configuration indicator states. The operations of 2005 may be performed in accordance with examples as disclosed herein. In some examples, aspects of the operations of 2005 may be performed by a control message interface 1525 as described with reference to FIG. 15.

At 2010, the method may include transmitting, after transmitting the first control message, a first downlink control information message that indicates that two transmission configuration indicator states are active, where the second downlink control information message includes the additional second set of fields based on the first downlink control information message indicating that the two transmission configuration indicator states are active. The operations of 2010 may be performed in accordance with examples as disclosed herein. In some examples, aspects of the operations of 2010 may be performed by a TCI field codepoint component 1540 as described with reference to FIG. 15.

At 2015, the method may include transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based on the first control message including the mapping. The operations of 2015 may be performed in accordance with examples as disclosed herein. In some examples, aspects of the operations of 2015 may be performed by a scheduling DCI component 1530 as described with reference to FIG. 15.

At 2020, the method may include receiving, from the UE, the uplink shared channel transmission in accordance with the downlink control information message. The operations of 2020 may be performed in accordance with examples as disclosed herein. In some examples, aspects of the operations of 2020 may be performed by a communication interface 1535 as described with reference to FIG. 15.

Aspect 1: A method for wireless communications at a UE, comprising: receiving a first control message including a mapping of at least one transmission configuration indicator codepoint to two transmission configuration indicator states; receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based at least in part on the first control message including the mapping; and transmitting the uplink shared channel transmission in accordance with the downlink control information message.

Aspect 2: The method of aspect 1, wherein the downlink control information message is a second downlink control information message, further comprising: receiving, after receiving the first control message, a first downlink control information message that indicates that the two transmission configuration indicator states are active, wherein the second downlink control information message includes the additional second set of fields based at least in part on the first downlink control information message indicating that the two transmission configuration indicator states are active.

Aspect 3: The method of aspect 2, wherein transmitting the uplink shared channel transmission comprises: transmitting the uplink shared channel transmission using one transmission configuration indicator state of the two transmission configuration indicator states that is listed first in the mapping or that has a lower transmission configuration indicator state identifier, wherein the one transmission configuration indicator state is used based at least in part on the UE being configured with a single sounding reference signal resource set.

Aspect 4: The method of aspect 3, further comprising: applying, to the uplink shared channel transmission, a beam associated with the one transmission configuration indicator state for the single sounding reference signal resource set.

Aspect 5: The method of any of aspects 2 through 4, further comprising: transmitting a feedback message that acknowledges the first downlink control information message, wherein the additional second set of fields are included in the second downlink control information message based at least in part on the first downlink control information message being received after a threshold number of symbols from transmission of the feedback message.

Aspect 6: The method of aspect 5, further comprising: receiving a radio resource control message that includes an indication of the threshold number of symbols.

Aspect 7: The method of any of aspects 2 through 6, further comprising: receiving a third downlink control information message during a time duration after receipt of the first downlink control information message and before a period during which the two transmission configuration indicator states are active, wherein the third downlink control information message schedules a second uplink shared channel transmission; determining that the third downlink control information message does not include the additional second set of fields based at least in part on the third downlink control information message being received during the time duration; and transmitting the second uplink shared channel transmission in accordance with the third downlink control information message.

Aspect 8: The method of aspect 7, wherein transmitting the second uplink shared channel transmission comprises: transmitting the second uplink shared channel transmission using one transmission configuration indicator state of the two transmission configuration indicator states that is listed first in the mapping or that has a lower transmission configuration indicator state identifier, wherein the one transmission configuration indicator state is used based at least in part on the third downlink control information message being received during the time duration and not including the additional second set of fields.

Aspect 9: The method of aspect 8, further comprising: applying, to a repetition of the second uplink shared channel transmission, a first sounding reference signal resource set of two sounding reference signal resource sets configured at the UE, wherein the first sounding reference signal resource set is applied based at least in part on the third downlink control information message being received during the time duration and not including the additional second set of fields.

Aspect 10: The method of any of aspects 7 through 9, further comprising: applying, as values for the additional second set of fields that are not included in the third downlink control information message, a set of fixed values, wherein the second uplink shared channel transmission is transmitted in accordance with the third downlink control information message and the set of fixed values applied for the additional second set of fields.

Aspect 11: The method of aspect 1, wherein the downlink control information message is a second downlink control information message, further comprising: receiving, after receiving the first control message, a first downlink control information message that includes an indication of a transmission configuration indicator codepoint that is mapped to a single transmission configuration indicator state; determining that the second downlink control information message is received during a period in which the two transmission configuration indicator states are active; and determining that the uplink shared channel transmission is scheduled during a period during which the single transmission configuration indicator state is active, wherein the uplink shared channel transmission is transmitted in accordance with the second downlink control information message.

Aspect 12: The method of aspect 11, wherein transmitting the uplink shared channel transmission comprises: transmitting, based at least in part on the uplink shared channel transmission being scheduled during a period which the single transmission configuration indicator state is active, the uplink shared channel transmission using the first set of fields specifying the configuration information for the first set of repetitions and without applying the additional second set of fields.

Aspect 13: The method of any of aspects 11 through 12, wherein transmitting the uplink shared channel transmission comprises: applying, as values for the additional second set of fields that are included in the second downlink control information message and based at least in part on the uplink shared channel transmission being scheduled during the period which the single transmission configuration indicator state is active, a set of fixed values, wherein the uplink shared channel transmission is transmitted in accordance with the second downlink control information message and the set of fixed values applied for the additional second set of fields.

Aspect 14: The method of aspect 13, further comprising: applying, to a repetition of the uplink shared channel transmission, a first sounding reference signal resource set of two sounding reference signal resource sets configured at the UE, wherein the first sounding reference signal resource set is applied based at least in part on the second downlink control information message being received during the period and not including the additional second set of fields.

Aspect 15: The method of any of aspects 1 through 14, further comprising: receiving a radio resource control message that configures a first sounding reference signal resource set to be applied to the first set of repetitions and a second sounding reference signal resource set to be applied to the second set of repetitions, wherein the downlink control information message includes the additional second set of fields based at least in part on the radio resource control message configuring the first sounding reference signal resource set and the second sounding reference signal resource set.

Aspect 16: The method of any of aspects 1 through 15, wherein the additional second set of fields comprise a sounding reference signal resource set indicator field, a second sounding reference signal resource indicator field, a second transmitted precoding matrix index (TPMI) field, a second phase tracking reference signal (PTRS) DMRS association field, a second transmit power control (TPC) command field, or a combination thereof.

Aspect 17: The method of any of aspects 1 through 16, further comprising: transmitting a feedback message that acknowledges the first control message, wherein the additional second set of fields are included in the downlink control information message based at least in part on the downlink control information message being received after a threshold time from transmission of the feedback message.

Aspect 18: The method of aspect 17, wherein the threshold time is 3 ms.

Aspect 19: The method of any of aspects 1 through 18, wherein the two transmission configuration indicator states are joint transmission configuration indicator states or both uplink transmission configuration indicator states.

Aspect 20: The method of any of aspects 1 through 19, wherein the downlink control information message activates the first set of repetitions and the second set of repetitions, further comprising: applying a first transmission configuration indicator state of the two transmission configuration indicator states to the first set of repetitions; and applying a second transmission configuration indicator state the two transmission configuration indicator states to the second set of repetitions, wherein the first set of repetitions and the second set of repetitions are transmitted in accordance with the downlink control information message.

Aspect 21: A method for wireless communication at a base station, comprising: transmitting, to a UE, a first control message including a mapping of at least one transmission configuration indicator codepoint to two transmission configuration indicator states; transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based at least in part on the first control message including the mapping; and receiving, from the UE, the uplink shared channel transmission in accordance with the downlink control information message.

Aspect 22: The method of aspect 21, wherein the downlink control information message is a second downlink control information message, further comprising: transmitting, after transmitting the first control message, a first downlink control information message that indicates that two transmission configuration indicator states are active, wherein the second downlink control information message includes the additional second set of fields based at least in part on the first downlink control information message indicating that the two transmission configuration indicator states are active.

Aspect 23: The method of aspect 22, wherein receiving the uplink shared channel transmission comprises: receiving the uplink shared channel transmission in accordance with one transmission configuration indicator state of the two transmission configuration indicator states that is listed first in the mapping or that has a lower transmission configuration indicator state identifier, wherein the one transmission configuration indicator state is used based at least in part on the UE being configured with a single sounding reference signal resource set.

Aspect 24: The method of aspect 23, further comprising: determining that the UE is to apply, to the uplink shared channel transmission, a beam associated with the one transmission configuration indicator state for the single sounding reference signal resource set.

Aspect 25: The method of any of aspects 22 through 24, further comprising: receiving, from the UE, a feedback message that acknowledges the first downlink control information message, wherein the additional second set of fields are included in the second downlink control information message based at least in part on the first downlink control information message being received after a threshold number of symbols from transmission of the feedback message.

Aspect 26: The method of aspect 25, further comprising: transmitting a radio resource control message that includes an indication of the threshold number of symbols.

Aspect 27: The method of any of aspects 22 through 26, further comprising: transmitting a third downlink control information message during a time duration after transmission of the first downlink control information message and before a period during which the two transmission configuration indicator states are active, wherein the third downlink control information message schedules a second uplink shared channel transmission, wherein the third downlink control information message does not include the additional second set of fields based at least in part on the third downlink control information message being transmitted during the time duration; and receiving the second uplink shared channel transmission in accordance with the third downlink control information message.

Aspect 28: The method of aspect 27, wherein receiving the second uplink shared channel transmission comprises: receiving the second uplink shared channel transmission in accordance with one transmission configuration indicator state of the two transmission configuration indicator states that is listed first in the mapping or that has a lower transmission configuration indicator state identifier, wherein the one transmission configuration indicator state is used based at least in part on the third downlink control information message being transmitted during the time duration and not including the additional second set of fields.

Aspect 29: The method of aspect 28, further comprising: determining that the UE is to apply to a repetition of the second uplink shared channel transmission, a first sounding reference signal resource set of two sounding reference signal resource sets configured at the UE, wherein the first sounding reference signal resource set is to be applied based at least in part on the third downlink control information message being received during the time duration and not including the additional second set of fields.

Aspect 30: The method of any of aspects 27 through 29, further comprising: determining that the UE is to apply, as values for the additional second set of fields that are not included in the third downlink control information message, a set of fixed values, wherein the second uplink shared channel transmission is transmitted in accordance with the third downlink control information message and the set of fixed values applied for the additional second set of fields.

Aspect 31: The method of aspect 21, further comprising: transmitting, after transmitting the first control message, a first downlink control information message that includes an indication of a transmission configuration indicator codepoint that is mapped to a single transmission configuration indicator state, wherein the second downlink control information message is transmitted during a period in which the two transmission configuration indicator states are active; and determining that the uplink shared channel transmission is scheduled during a period during which the single transmission configuration indicator state is active, wherein the uplink shared channel transmission is received in accordance with the second downlink control information message.

Aspect 32: The method of aspect 31, further comprising: determining, based at least in part on the uplink shared channel transmission being scheduled during a period which the single transmission configuration indicator state is active, that the UE is to apply the first set of fields specifying the configuration for the first set of repetitions and without applying the additional second set of fields.

Aspect 33: The method of any of aspects 31 through 32, further comprising: determining, based at least in part on the uplink shared channel transmission being scheduled during the period which the single transmission configuration indicator state is active, that the UE is to apply, as values for the additional second set of fields that are included in the second downlink control information message, a set of fixed values, wherein the uplink shared channel transmission is received in accordance with the second downlink control information message and the set of fixed values applied for the additional second set of fields.

Aspect 34: The method of aspect 33, further comprising: determining, based at least in part on the uplink shared channel transmission being scheduled during the period which the single transmission configuration indicator state is active, that the UE is to apply, to a repetition of the uplink shared channel transmission, a first sounding reference signal resource set of two sounding reference signal resource sets configured at the UE.

Aspect 35: The method of any of aspects 21 through 34, further comprising: transmitting, to the UE, a radio resource control message that configures a first sounding reference signal resource set to be applied to the first set of repetitions and a second sounding reference signal resource set to be applied to the second set of repetitions, wherein the downlink control information message includes the additional second set of fields based at least in part on the radio resource control message configuring the first sounding reference signal resource set and the second sounding reference signal resource set.

Aspect 36: The method of any of aspects 21 through 35, wherein the additional second set of fields comprise a sounding reference signal resource set indicator field, a second sounding reference signal resource indicator field, a second transmitted precoding matrix index (TPMI) field, a second phase tracking reference signal (PTRS) DMRS association field, a second transmit power control (TPC) command field, or a combination thereof.

Aspect 37: The method of any of aspects 21 through 36, further comprising: receiving, from the UE, a feedback message that acknowledges the first control message, wherein the additional second set of fields are included in the downlink control information message based at least in part on the downlink control information message being received after a threshold time from transmission of the feedback message.

Aspect 38: The method of aspect 37, wherein the threshold time is 3 ms.

Aspect 39: The method of any of aspects 21 through 38, wherein the two transmission configuration indicator states are joint transmission configuration indicator states or both uplink transmission configuration indicator states.

Aspect 40: The method of any of aspects 21 through 39, the downlink control information message activates the first set of repetitions and the second set of repetitions, further comprising: determining that the UE is to apply a first transmission configuration indicator state of the two transmission configuration indicator states to the first set of repetitions; and determining that the UE is to apply a second transmission configuration indicator state of the two transmission configuration indicator states to the second set of repetitions, wherein the first set of repetitions and the second set of repetitions are received in accordance with the downlink control information message.

Aspect 41: An apparatus for wireless communications at a UE, comprising a processor; memory coupled with the processor; and instructions stored in the memory and executable by the processor to cause the apparatus to perform a method of any of aspects 1 through 20.

Aspect 42: An apparatus for wireless communications at a UE, comprising at least one means for performing a method of any of aspects 1 through 20.

Aspect 43: A non-transitory computer-readable medium storing code for wireless communications at a UE, the code comprising instructions executable by a processor to perform a method of any of aspects 1 through 20.

Aspect 44: An apparatus for wireless communication at a base station, comprising a processor; memory coupled with the processor; and instructions stored in the memory and executable by the processor to cause the apparatus to perform a method of any of aspects 21 through 40.

Aspect 45: An apparatus for wireless communication at a base station, comprising at least one means for performing a method of any of aspects 21 through 40.

Aspect 46: A non-transitory computer-readable medium storing code for wireless communication at a base station, the code comprising instructions executable by a processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving a first control message including a mapping of at least one transmission configuration indicator codepoint to two transmission configuration indicator states;
    receiving a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based at least in part on the first control message including the mapping; and
    transmitting the uplink shared channel transmission in accordance with the downlink control information message.

2. The method of claim 1, wherein the downlink control information message is a second downlink control information message, further comprising:
    receiving, after receiving the first control message, a first downlink control information message that indicates that the two transmission configuration indicator states are active, wherein the second downlink control information message includes the additional second set of fields based at least in part on the first downlink control information message indicating that the two transmission configuration indicator states are active.

3. The method of claim 2, wherein transmitting the uplink shared channel transmission comprises:
transmitting the uplink shared channel transmission using one transmission configuration indicator state of the two transmission configuration indicator states that is listed first in the mapping or that has a lower transmission configuration indicator state identifier, wherein the one transmission configuration indicator state is used based at least in part on the UE being configured with a single sounding reference signal resource set.

4. The method of claim 3, further comprising:
applying, to the uplink shared channel transmission, a beam associated with the one transmission configuration indicator state for the single sounding reference signal resource set.

5. The method of claim 2, further comprising:
transmitting a feedback message that acknowledges the first downlink control information message, wherein the additional second set of fields are included in the second downlink control information message based at least in part on the first downlink control information message being received after a threshold number of symbols from transmission of the feedback message.

6. The method of claim 5, further comprising:
receiving a radio resource control message that includes an indication of the threshold number of symbols.

7. The method of claim 2, further comprising:
receiving a third downlink control information message during a time duration after receipt of the first downlink control information message and before a period during which the two transmission configuration indicator states are active, wherein the third downlink control information message schedules a second uplink shared channel transmission;
determining that the third downlink control information message does not include the additional second set of fields based at least in part on the third downlink control information message being received during the time duration; and
transmitting the second uplink shared channel transmission in accordance with the third downlink control information message.

8. The method of claim 7, wherein transmitting the second uplink shared channel transmission comprises:
transmitting the second uplink shared channel transmission using one transmission configuration indicator state of the two transmission configuration indicator states that is listed first in the mapping or that has a lower transmission configuration indicator state identifier, wherein the one transmission configuration indicator state is used based at least in part on the third downlink control information message being received during the time duration and not including the additional second set of fields.

9. The method of claim 8, further comprising:
applying, to a repetition of the second uplink shared channel transmission, a first sounding reference signal resource set of two sounding reference signal resource sets configured at the UE, wherein the first sounding reference signal resource set is applied based at least in part on the third downlink control information message being received during the time duration and not including the additional second set of fields.

10. The method of claim 7, further comprising:
applying, as values for the additional second set of fields that are not included in the third downlink control information message, a set of fixed values, wherein the second uplink shared channel transmission is transmitted in accordance with the third downlink control information message and the set of fixed values applied for the additional second set of fields.

11. The method of claim 1, wherein the downlink control information message is a second downlink control information message, further comprising:
receiving, after receiving the first control message, a first downlink control information message that includes an indication of a transmission configuration indicator codepoint that is mapped to a single transmission configuration indicator state;
determining that the second downlink control information message is received during a period in which the two transmission configuration indicator states are active; and
determining that the uplink shared channel transmission is scheduled during a period during which the single transmission configuration indicator state is active, wherein the uplink shared channel transmission is transmitted in accordance with the second downlink control information message.

12. The method of claim 11, wherein transmitting the uplink shared channel transmission comprises:
transmitting, based at least in part on the uplink shared channel transmission being scheduled during a period which the single transmission configuration indicator state is active, the uplink shared channel transmission using the first set of fields specifying the configuration information for the first set of repetitions and without applying the additional second set of fields.

13. The method of claim 11, wherein transmitting the uplink shared channel transmission comprises:
applying, as values for the additional second set of fields that are included in the second downlink control information message and based at least in part on the uplink shared channel transmission being scheduled during the period which the single transmission configuration indicator state is active, a set of fixed values, wherein the uplink shared channel transmission is transmitted in accordance with the second downlink control information message and the set of fixed values applied for the additional second set of fields.

14. The method of claim 13, further comprising:
applying, to a repetition of the uplink shared channel transmission, a first sounding reference signal resource set of two sounding reference signal resource sets configured at the UE, wherein the first sounding reference signal resource set is applied based at least in part on the second downlink control information message being received during the period and not including the additional second set of fields.

15. The method of claim 1, further comprising:
receiving a radio resource control message that configures a first sounding reference signal resource set to be applied to the first set of repetitions and a second sounding reference signal resource set to be applied to the second set of repetitions, wherein the downlink control information message includes the additional second set of fields based at least in part on the radio resource control message configuring the first sounding reference signal resource set and the second sounding reference signal resource set.

16. The method of claim 1, wherein the additional second set of fields comprise a sounding reference signal resource set indicator field, a second sounding reference signal resource indicator field, a second transmitted precoding matrix index (TPMI) field, a second phase tracking reference signal (PTRS) demodulation reference signal (DMRS) association field, a second transmit power control (TPC) command field, or a combination thereof.

17. The method of claim 1, further comprising:
transmitting a feedback message that acknowledges the first control message, wherein the additional second set of fields are included in the downlink control information message based at least in part on the downlink control information message being received after a threshold time from transmission of the feedback message.

18. The method of claim 17, wherein the threshold time is 3 ms.

19. The method of claim 1, wherein the two transmission configuration indicator states are joint transmission configuration indicator states or both uplink transmission configuration indicator states.

20. The method of claim 1, wherein the downlink control information message activates the first set of repetitions and the second set of repetitions, further comprising:
applying a first transmission configuration indicator state of the two transmission configuration indicator states to the first set of repetitions; and
applying a second transmission configuration indicator state the two transmission configuration indicator states to the second set of repetitions, wherein the first set of repetitions and the second set of repetitions are transmitted in accordance with the downlink control information message.

21. A method for wireless communications at a base station, comprising:
transmitting, to a user equipment (UE), a first control message including a mapping of at least one transmission configuration indicator codepoint to two transmission configuration indicator states;
transmitting, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based at least in part on the first control message including the mapping; and
receiving, from the UE, the uplink shared channel transmission in accordance with the downlink control information message.

22. The method of claim 21, wherein the downlink control information message is a second downlink control information message, further comprising:
transmitting, after transmitting the first control message, a first downlink control information message that indicates that two transmission configuration indicator states are active, wherein the second downlink control information message includes the additional second set of fields based at least in part on the first downlink control information message indicating that the two transmission configuration indicator states are active.

23. The method of claim 22, wherein receiving the uplink shared channel transmission comprises:
receiving the uplink shared channel transmission in accordance with one transmission configuration indicator state of the two transmission configuration indicator states that is listed first in the mapping or that has a lower transmission configuration indicator state identifier, wherein the one transmission configuration indicator state is used based at least in part on the UE being configured with a single sounding reference signal resource set.

24. The method of claim 23, further comprising:
determining that the UE is to apply, to the uplink shared channel transmission, a beam associated with the one transmission configuration indicator state for the single sounding reference signal resource set.

25. The method of claim 22, further comprising:
receiving, from the UE, a feedback message that acknowledges the first downlink control information message, wherein the additional second set of fields are included in the second downlink control information message based at least in part on the first downlink control information message being received after a threshold number of symbols from transmission of the feedback message.

26. The method of claim 21, further comprising:
transmitting, to the UE, a radio resource control message that configures a first sounding reference signal resource set to be applied to the first set of repetitions and a second sounding reference signal resource set to be applied to the second set of repetitions, wherein the downlink control information message includes the additional second set of fields based at least in part on the radio resource control message configuring the first sounding reference signal resource set and the second sounding reference signal resource set.

27. The method of claim 21, wherein the additional second set of fields comprise a sounding reference signal resource set indicator field, a second sounding reference signal resource indicator field, a second transmitted precoding matrix index (TPMI) field, a second phase tracking reference signal (PTRS) demodulation reference signal (DMRS) association field, a second transmit power control (TPC) command field, or a combination thereof.

28. The method of claim 21, wherein the two transmission configuration indicator states are joint transmission configuration indicator states or both uplink transmission configuration indicator states.

29. An apparatus for wireless communications at a user equipment (UE), comprising:
a processor;
memory in electronic communication with the processor; and
instructions stored in the memory, wherein the instructions are executable by the processor to:
receive a first control message including a mapping of at least one transmission configuration indicator codepoint to two transmission configuration indicator states;
receive a downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based at least in part on the first control message including the mapping; and transmit the uplink shared channel transmission in accordance with the downlink control information message.

30. An apparatus for wireless communications at a base station, comprising:

a processor;

memory in electronic communication with the processor; and instructions stored in the memory, wherein the instructions are executable by the processor to:

transmit, to a user equipment (UE), a first control message including a mapping of at least one transmission configuration indicator codepoint to two transmission configuration indicator states;

transmit, to the UE, downlink control information message that schedules an uplink shared channel transmission, the downlink control information message including a first set of fields specifying configuration information for a first set of repetitions of the uplink shared channel transmission and an additional second set of fields specifying configuration information for a second set of repetitions of the uplink shared channel transmission, the additional second set of fields included in the downlink control information message based at least in part on the first control message including the mapping; and receive, from the UE, the uplink shared channel transmission in accordance with the downlink control information message.

* * * * *